United States Patent
Garin

(10) Patent No.: US 9,160,980 B2
(45) Date of Patent: Oct. 13, 2015

(54) CAMERA-BASED INERTIAL SENSOR ALIGNMENT FOR PND

(75) Inventor: Lionel J. Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

(21) Appl. No.: 13/173,261

(22) Filed: Jun. 30, 2011

(65) Prior Publication Data

US 2012/0176492 A1     Jul. 12, 2012

Related U.S. Application Data

(60) Provisional application No. 61/431,748, filed on Jan. 11, 2011.

(51) Int. Cl.
| | |
|---|---|
| *H04N 7/18* | (2006.01) |
| *G01C 21/16* | (2006.01) |
| *G01C 25/00* | (2006.01) |
| *G06T 7/00* | (2006.01) |

(52) U.S. Cl.
CPC ................ *H04N 7/18* (2013.01); *G01C 21/165* (2013.01); *G01C 25/005* (2013.01); *G06T 7/004* (2013.01); *G06T 2207/10016* (2013.01); *G06T 2207/30252* (2013.01)

(58) Field of Classification Search
CPC ... H04N 7/18; G06T 7/004; G06T 2207/30252; G06T 2207/10016; G01C 25/005; G01C 21/165
USPC .......................................................... 348/116
See application file for complete search history.

(56) References Cited

U.S. PATENT DOCUMENTS

| | | | |
|---|---|---|---|
| 6,594,600 B1 | 7/2003 | Arnoul et al. | |
| 8,718,938 B2 | 5/2014 | Wolf et al. | |
| 2004/0098178 A1* | 5/2004 | Brady et al. | ....................... 701/4 |
| 2008/0114545 A1 | 5/2008 | Takaoka et al. | |
| 2008/0252736 A1* | 10/2008 | McLeod | .................. 348/208.99 |
| 2009/0046199 A1* | 2/2009 | Nanjo | ............................ 348/347 |
| 2010/0100321 A1* | 4/2010 | Koenig et al. | ................. 701/214 |
| 2010/0131197 A1 | 5/2010 | Zhang et al. | |
| 2010/0226437 A1* | 9/2010 | Robertson et al. | ........ 375/240.16 |

(Continued)

FOREIGN PATENT DOCUMENTS

| | | |
|---|---|---|
| CN | 101067557 A | 11/2007 |
| JP | H0778255 A | 3/1995 |
| JP | 2007108326 A | 4/2007 |

(Continued)

OTHER PUBLICATIONS

Wolfram Mathworld matrix multiplication, http://mathworld.wolfram.com/MatrixMultiplication.html.*

(Continued)

*Primary Examiner* — Allen Wong
(74) *Attorney, Agent, or Firm* — Silicon Valley Patent Group LLP

(57) ABSTRACT

An apparatus and method to enhance dead-reckoning navigation using inertial sensor measurements based on images from a camera are disclosed. A camera build into a mobile device is used to calibrate inertial sensors and rotation matrices. Images from a camera may be used (1) to remove a gravitational element from accelerometer measurements; (2) to set a scaling factor and an offset for a gyrometer; and (3) to set initial and updated values for rotation matrices.

26 Claims, 20 Drawing Sheets

(56) References Cited

U.S. PATENT DOCUMENTS

2010/0245592 A1    9/2010   Inui et al.
2011/0010026 A1*   1/2011   Jensen et al. ..................... 701/3

FOREIGN PATENT DOCUMENTS

| | | |
|---|---|---|
| JP | 2007315956 A | 12/2007 |
| JP | 2008058187 A | 3/2008 |
| JP | 2009002754 A | 1/2009 |
| WO | 2008118874 A2 | 10/2008 |
| WO | 2010096670 A1 | 8/2010 |

OTHER PUBLICATIONS

International Search Report and Written Opinion—PCT/US2012/020623—ISA/EPO—Feb. 18, 2013.

* cited by examiner

| Reference vector | Reference system | | |
|---|---|---|---|
| | BRS | PRS | LRS |
| First reference vector (direction of gravity) | $\vec{g}_{BRS}$ | $\vec{g}_{PRS}$ (Z-axis + slope) | $\vec{g}_{LRS}$ (Z-axis) |
| Second reference vector (direction of motion) | $\vec{D}_{BRS}$ | $\vec{D}_{PRS}$ (X-axis) | $\vec{D}_{LRS}$ GPS velocity direction |

US 9,160,980 B2

CAMERA-BASED INERTIAL SENSOR ALIGNMENT FOR PND

CROSS-REFERENCE TO RELATED APPLICATIONS

This application claims priority to and the benefit of U.S. Provisional Application 61/431,748 filed on Jan. 11, 2011 titled "Camera-based inertial sensor alignment for PND", which is incorporated by reference herein in its entirety.

BACKGROUND

I. Field of the Invention

The invention relates generally to navigation based on image processing, and more specifically to determining an orientation of a personal navigation device, relative to a moving vehicle, for interpreting accelerometer and gyrometer measurements.

II. Background

Position estimates are often provided by receiving and processing satellite positioning signals. When satellite signals are not available, a mobile device resorts to dead-reckoning techniques to estimate incremental positioning updates. Usually, dead-reckoning techniques rely on measurement data from inertial sensors (e.g., accelerometers and gyrometers). Such inertial sensors must be frequently calibrated to maintain reliable measurements. For example, when an accelerometer detects no acceleration besides gravity, the mobile device may be presumed stationary at which time the gyrometer is eligible to be calibrated. Even with frequent recalibration, inertial sensors provide sensor measurements with some inherent error. These errors accumulate over time and, if the sensors are left un-calibrated, at some point position estimates provided by dead reckoning will no longer be reliable. An improved method and device are needed to reduce these inherent errors.

BRIEF SUMMARY

According to some aspects, disclosed is a mobile device using images for navigation, the mobile device comprising: a camera, wherein the camera acquires a sequence of images; a memory to hold a first rotation matrix, wherein the first rotation matrix is for converting between a body reference system of the mobile device and a platform reference system; and a processor coupled to the camera and the memory, wherein the processor is configured to determine an initial value of the first rotation matrix based on the sequence of images.

According to some aspects, disclosed is a method in a mobile device of using images for navigation, the method comprising: acquiring a sequence of images from a camera; determining an initial value of a first rotation matrix based on the sequence of images used to convert from a body reference system of the mobile device; writing the first rotation matrix to memory; and converting measurements, between a body reference system of the mobile device and a local reference system, using the first rotation matrix.

According to some aspects, disclosed is a mobile device using images for navigation, the mobile device comprising: means for acquiring a sequence of images from a camera; means for determining an initial value of a first rotation matrix based on the sequence of images used to convert from a body reference system of the mobile device; means for writing the first rotation matrix to memory; and means for converting measurements, between the body reference system of the mobile device and a local reference system, using the first rotation matrix.

According to some aspects, disclosed is a computer-readable medium tangibly embodying a program of machine-readable instructions executable by a digital processing apparatus to perform a method for using images for navigation in a mobile device having a camera, memory and a processor, said method comprising operations of: acquiring a sequence of images from a camera; determining an initial value of a first rotation matrix based on the sequence of images used to convert from a body reference system of the mobile device; writing the first rotation matrix to memory; and converting measurements, between the body reference system of the mobile device and a local reference system, using the first rotation matrix.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
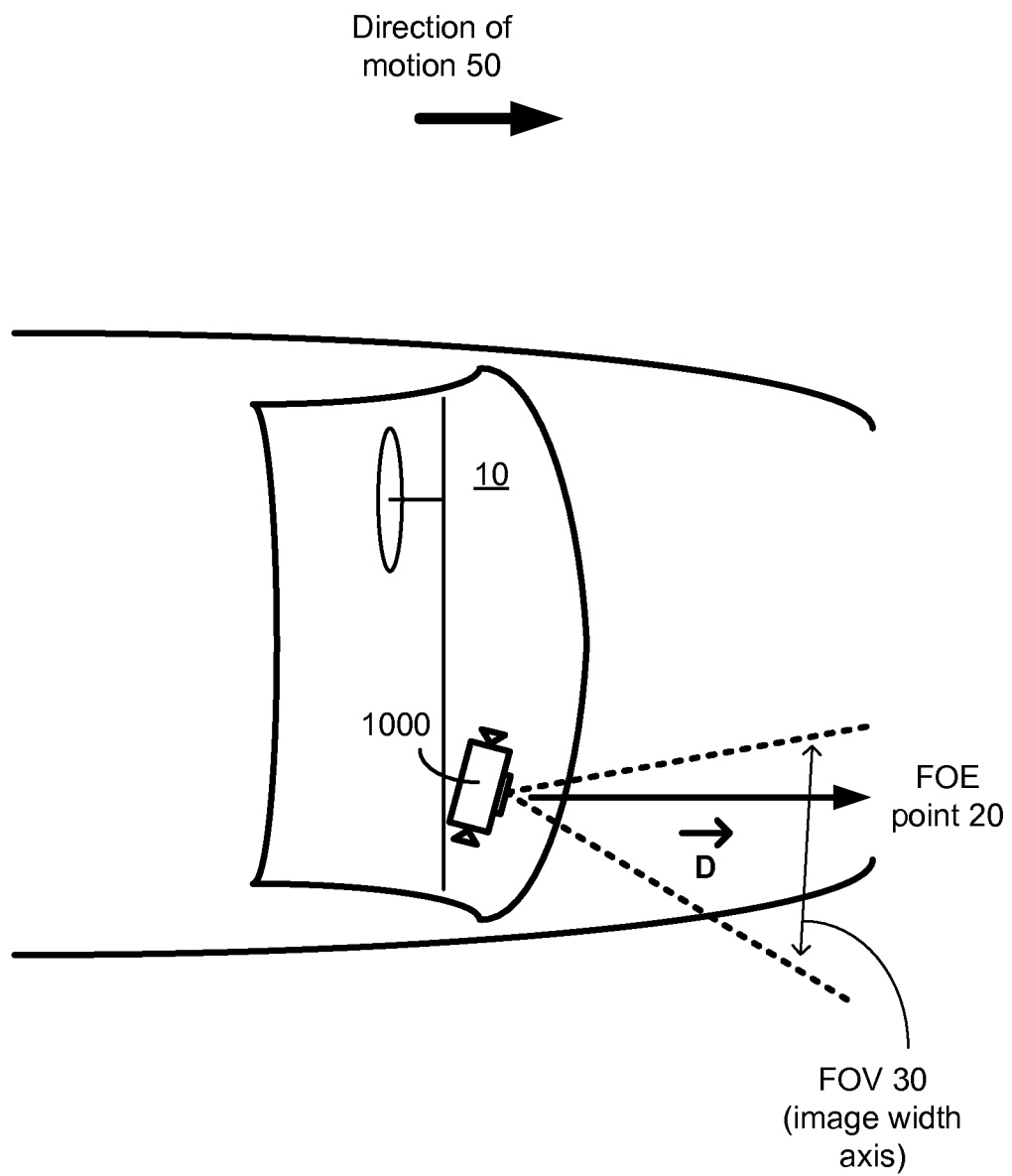
FIGS. 1, 2 and 3 show various views of a personal navigation device (PND) mounted in a vehicle.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a personal navigation device (PND) refers to a mobile device such as a cellular or other wireless communication device, personal communication system (PCS) device, mobile station (MS), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a PND.

Figure 2:
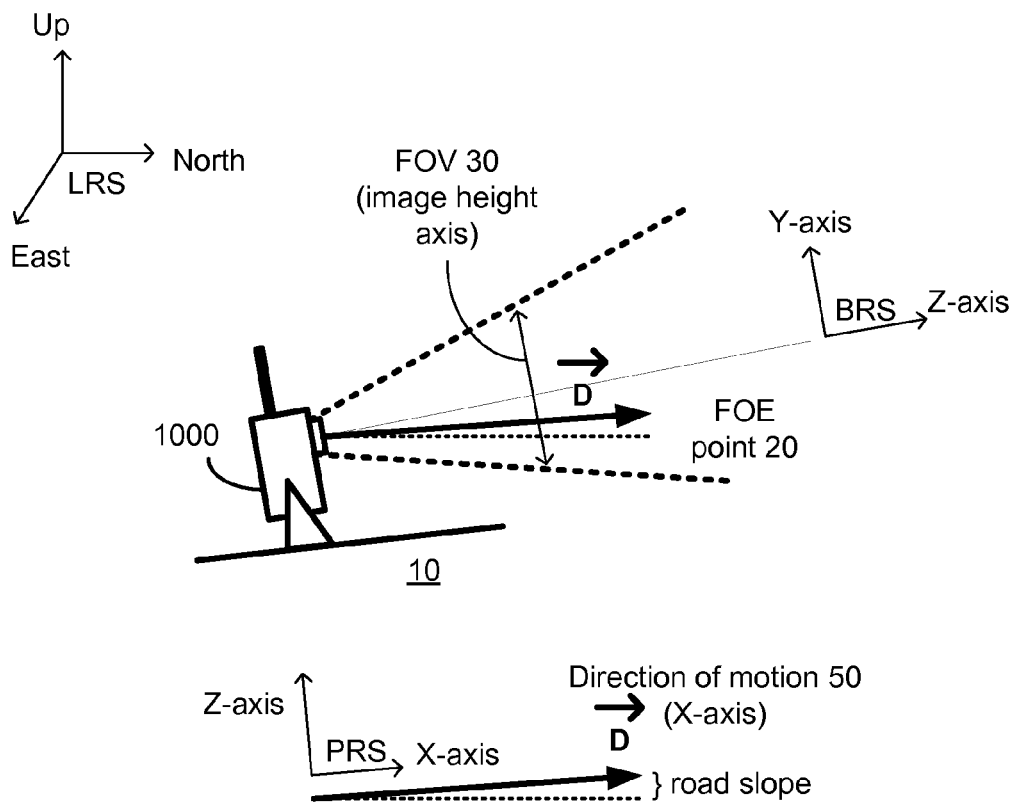
Figure 3:
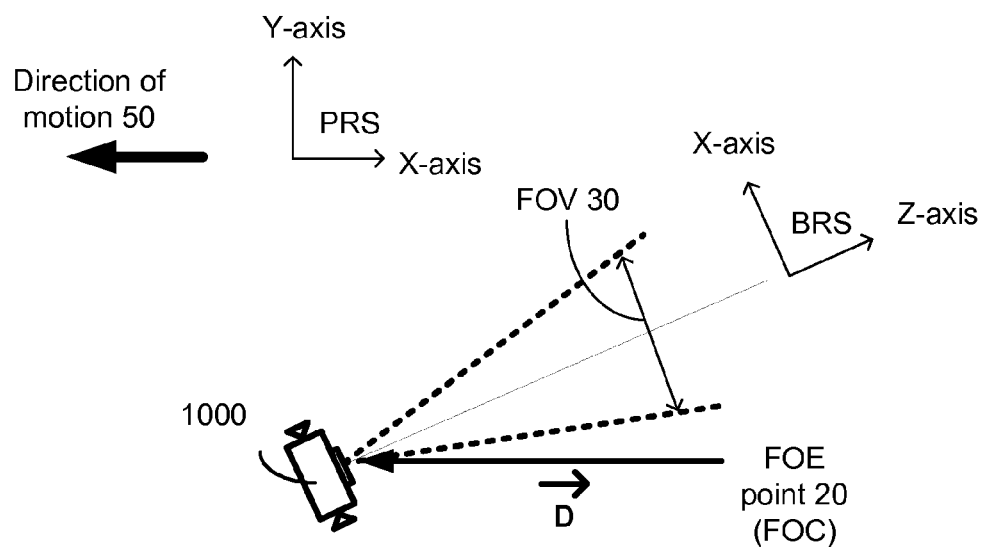

FIGS. 1, 2 and 3 show various views of a PND 1000 mounted in a vehicle. In FIG. 1, a top-down view shows a PND 1000 mounted on a dashboard of a vehicle 10. The PND 1000 is mechanically coupled to the vehicle 10 (e.g., via a swivel mount, bracket or car hands-free kit). The vehicle 10 may be at rest or traveling at a constant speed, accelerating or decelerating. When moving, the vehicle 10 travels in a straight line, turns to the right or to the left, and may hold a particular elevation or gradually increase or decrease in elevation. Nonholonomic constraints may be imposed such that vehicle movement is assumed to be either forwards or backwards and any movement vertically and sideways may be restricted. Holonomic systems are loosely described as mechanical systems with constraints on velocity that are not derivable from position or attitude constraints.

In this example, the vehicle 10 is shown traveling forward defining a direction of motion 50 relative to a local reference system (LRS). The local reference system is relative to the surface of the Earth. In the local reference system, a position may be represented by a set of Cartesian coordinates in a LRS locally attached to the Earth. An example of such an LRS is identified by NEU (North, East, Up) with an origin at current position or a recent past position. Linear movement may be represented by a Cardinal direction or compass heading, a road slope and a speed. Gravity in the local reference system is along the up/down axis.

A second reference system, defined by the vehicle 10, is referred to as a platform reference system (PRS). An arbitrary point in the vehicle is set as the origin of the platform reference system. For example, the mounting structure on a dashboard, the center of mass of the vehicle 10, the driver's seat, the driver's point of viewing, or a front corner may be defined as the origin (0, 0, 0) of the platform reference system. In the platform reference system, an X-axis may be defined in line with the forward direction of motion 50 of the vehicle 10, a Y-axis may represent a sideways axis to the left from the vehicle 10, and a Z-axis may represent a vertical axis from the vehicle 10. The platform reference system is independent from the local reference system except that vehicle motion may be restricted to X-axis motion (forwards and backwards) and Y-axis motion (left and right) with motion noise set for the Z-axis (up and down).

A third reference system, defined by the PND 1000, is referred to as the body reference system (BRS), which is set by an orientation of the body of the PND 1000. For example, a center of a camera lens or the center of an image sensor of the PND 100 may be set as the origin (0, 0, 0) of the body reference system. In the body reference system for the PND 1000 having a camera or other image sensor (referred to as camera 100), an X-axis represents an image width axis of the camera 100, a Y-axis represents an image height axis of the camera 100, and a Z-axis defines a line along the viewing direction of the camera 100. The body reference system is independent from the local reference system. The body reference system is also independent from the platform reference system. That is, the PND 1000 may be oriented in any fashion in the platform reference system (e.g., right side up, upside down, lying flat). All inertial sensors in the PND 1000 and their sensitivity axes may also be defined in the same orthogonal X, Y & Z-axes as the imaging sensor.

The camera 100 of the PND 1000 defines a field of view (FOV 30), which describes an angular horizontal and vertical breadth of a captured image. The FOV 30 defines a visible angle relative to the image width axis and a visible angle relative to the image height axis in an image plane. Also, when moving forward in a straight line, an imaginary point exists in the camera's image plane from which a projection of distant objects in the image plane appears to originate. This point is defined as a Focus of Expansion (FOE point 20). The FOE point 20 points in the direction of motion 50. The FOE point 20 may be defined by a motion vector ($\vec{D}$) that is a unit vector oriented along an imaginary line starting at the camera's Center of Projection (COP) and ending at the FOE point 20 in the image plane. In this example illustrated, the FOV 30 encompasses the FOE point 20 and motion vector ($\vec{D}$). Depending on camera orientation with respect to movement of the vehicle 10, the FOV 30 may or may not encompass the FOE point 20 and motion vector ($\vec{D}$). That is, the FOE point 20 may or may not lie inside the image plane or imaging area of the camera 100. Also, the FOE point 20 might be temporarily indefinite, for example, when the vehicle 10 is not traveling in a straight line, such as when it is turning or stationary.

FIG. 2 shows a side view of the PND 1000 mounted on the dashboard of the vehicle 10. The camera 100 of the PND 1000 defines a FOV 30 across an image height axis (shown as the Y-axis in the BRS). In this case, the FOE point 20 and motion vector ($\vec{D}$) are within the FOV 30. As shown, the platform is defined by the vehicle 10. The direction of motion 50 is the same as the motion vector ($\vec{D}$) and off from the X-axis of the platform reference system by a road slope. Within both reference systems, the axes are shown orthogonal within a reference system.

FIG. 3 shows a different example of the case when the FOE point 20 and motion vector ($\vec{D}$) fall outside of the FOV 30. This means that the FOE point 20 is not within view of the camera 100; however, the FOE point 20 and corresponding motion vector ($\vec{D}$) may still be computed as described below. The figure also illustrates the case where a camera 100 points away from the direction of motion 50. In this case, the FOE point 20 may be referred to as the field of contraction (FOC) point. The FOC point is a complement to the FOE point 20. Instead of zooming into an image, the camera 100 appears to zoom out of an image from a single FOC point.

Figure 4:
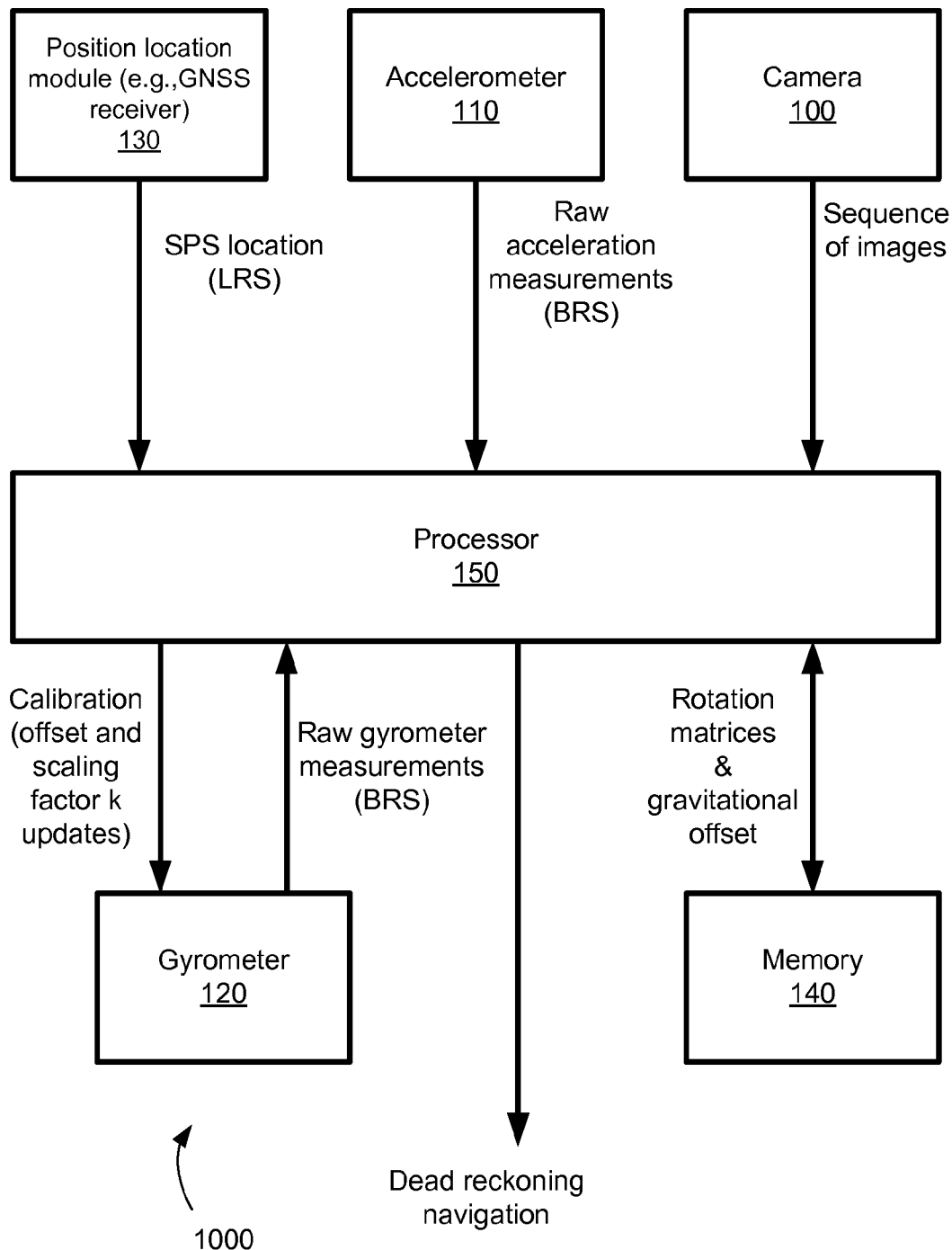
FIG. 4 shows a block diagram of a PND, in accordance with embodiments of the present invention.

FIG. 4 shows a block diagram of a PND 1000, in accordance with embodiments of the present invention. The PND 1000 implements camera-based navigation techniques and includes a camera 100, an accelerometer 110, a gyrometer 120, a position location module 130, memory 140 and a processor 150. The processor 150 may be directly or indirectly connected to each of these modules as described further below.

The camera 100 acts as a means for acquiring a sequence of images, which may be sequential still images, or alternatively a video stream. Depending on the embodiment, the images provided by the camera 100 may be analog or digital and may be high, medium or low resolution. The camera 100 may have a single lens or may be a stereo camera (providing a left image and a right image as the sequence of images). The processor 150 analyzes these images to enhance position determination, enhance dead-reckoning navigation and enable sensor calibration.

The accelerometer 110 generates linear acceleration measurements (identified as raw acceleration measurements), which are relative to the body reference system. The gyrometer 120 generates angular acceleration measurements (identified as raw gyrometer measurements), which are also relative to the body reference system. The gyrometer 120 may require updates to both an offset and a scaling factor k to calibrate the gyrometer measurements. The accelerometer 110 may also require updates to an offset and a scaling factor k to calibrate the accelerometer measurements.

The accelerometer 110 and gyrometer 120 may each be a one, two or three-dimensional module, such as provided by known MEMS devices. That is, the accelerometer 110 may be a single-axis accelerometer, a double-axis accelerometer, or a three-dimensional (3-D) accelerometer. Similarly, the gyrometer 120 may be a single-axis gyrometer, a double-axis gyrometer, or a 3-D gyrometer. To be most effective though, the PND 1000 includes 3-D modules. A 3-D sensor senses along (linear) or about (angular) three orthogonal axes. For example, the accelerometer 110 may be a 3-D module sensing linear acceleration along three orthogonal X-Y-Z axes in the body reference system. Similarly, the gyrometer 120 may be a 3-D module sensing angular acceleration about the three orthogonal axes. The accelerometer 110 and the gyrometer 120 are shown as separate modules; however, they may be integrated into single inertial sensor module.

Raw sensor measurements may be directly provided to the processor 150 as acceleration and gyrometer measurements or, alternatively, raw sensor measurements may be filtered and/or integrated, then provided to the processor 150 as acceleration and gyrometer measurements. The raw sensor measurements indicate an acceleration (the accelerometer 110 generates linear acceleration measurements and the gyrometer 120 generates angular acceleration measurements). A first integration of the raw sensor measurements converts the linear and angular acceleration into linear and angular velocities. A second integration converts the linear and angular velocities into linear and angular displacements, which may be used for dead-reckoning position estimates. The filtering and/or integration may be performed within the inertial sensor or alternatively in the processor 150 or partially in each the inertial sensor and partially in the processor 150.

Since the original raw sensor measurements are acquired in the body reference system, measurements must ultimately be converted to the local reference system before they are integrated. Several different approaches may be used. A first approach uses two steps. The first step entails using a first rotation matrix ($C_{PRS \leftarrow BRS}$) to convert raw measurement in the body reference system to interim measurements in the platform reference system. In some embodiments, the measurements are altered by placing constraints on the interim measurements in the platform reference system. For example, sideways and/or vertical acceleration may be filtered, zeroed or otherwise limited (e.g., limited with nonholonomic constraints). A second step uses a second rotation matrix ($C_{LRS \leftarrow PRS}$) to convert the interim measurements in the platform reference system to measurements in the local reference system. The measurements then undergo a double integration. A different approach uses only a third rotation matrix and does not compute interim data. If the interim data is not altered, the first and second conversion matrices may be combined in to a third rotation matrix ($C_{LRS \leftarrow BRS} = C_{LRS \leftarrow PRS} \times C_{PRS \leftarrow BRS}$). In any case, accurate and frequently updated conversion matrices results in an integrated result with less accumulated noise and error.

The position location module 130 may be a GNSS receiver or other satellite receiver (e.g., GPS receiver) and/or a pseudolite receiver. The position location module 130 generates SPS location information, which may range from being unprocessed signals (e.g., raw SPS signals) or fully processed signals (e.g., a longitude/latitude position or a longitude/latitude/altitude (LLA) position and/or a linear displacement). The SPS location information is used to define the local reference system.

The processor 150 receives a sequence of images from the camera 100 and raw inertial sensor measurements from the inertial sensor (both the accelerometer 110 and the gyrometer 120). The processor 150 is configured to determine an initial value of the first, second and/or third rotation matrices ($C_{PRS \leftarrow BRS}$, $C_{LRS \leftarrow PRS}$, and $C_{LRS \leftarrow BRS}$) based on a sequence of images from the camera 100 and based on an estimated direction for the gravity vector as explained in detail below. In this sense, the processor 150 acts as a means for determining an initial value of a rotation matrix based on the sequence of images.

The processor 150 is configured to determine an initial value of a gravitational vector based on the sequence of images and save this gravitational vector to memory 140. The gravitational vector is used in part to orient the first rotation matrix ($C_{PRS \leftarrow BRS}$) and indirectly later to null an effect of gravity in the accelerometer measurements.

Based on the sensor measurements and sequence of images, the processor 150 determines the gravitational vector, initializes and updates the rotation matrices, calibrates the gyrometer 120 and provides position estimates using dead reckoning. That is, the processor 150 acts as a means for writing the gravitational vector and rotation matrices to memory 140. The processor 150 later uses the rotation matrices from memory 140 in converting among a body reference system, a platform reference system and a local reference system. The memory 140 holds rotation matrices initialized and updated by the processor 150.

Figure 5:
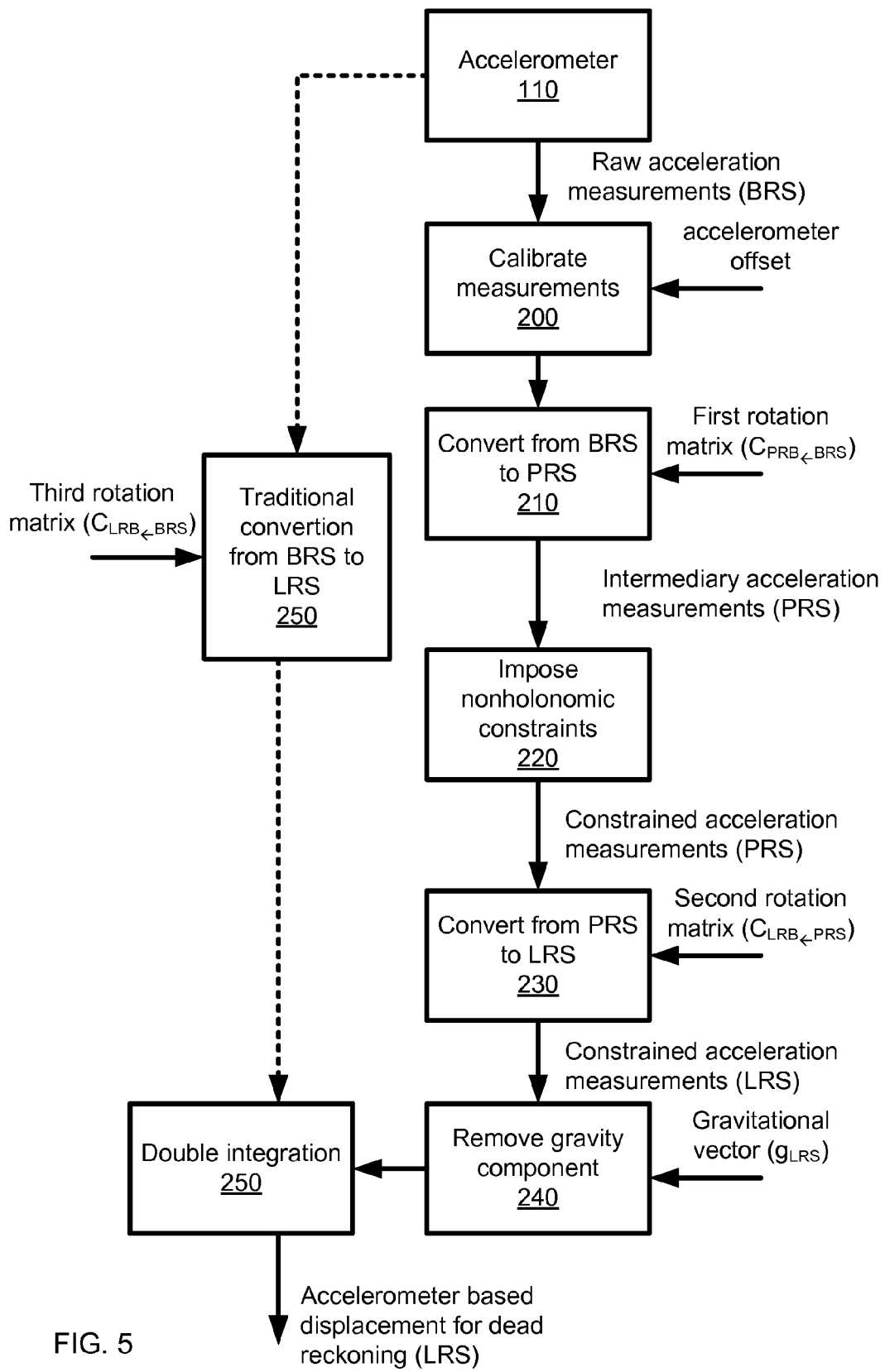
FIG. 5 shows a data flow diagrams for dead reckoning, in accordance with embodiments of the present invention.

FIG. 5 shows a data flow diagrams for dead reckoning, in accordance with embodiments of the present invention.

At 200, the processor 150 receives raw acceleration measurements from the accelerometer 110. The raw acceleration measurements are provided with reference to the body reference system. The processor 150 removes any known accelerometer offset from the raw acceleration measurements to result in raw acceleration, in the body reference system, still with gravity but without any known accelerometer offset error.

At 210, using the first rotation matrix ($C_{PRS \leftarrow BRS}$) found in memory 140, the processor 150 converts the raw acceleration without known accelerometer offset from the body reference system to the platform reference system to result in intermediary acceleration measurements.

At 220, the processor 150 imposes nonholonomic constraints on the intermediary acceleration measurement. For example, the processor 150 assumes acceleration is not possible in the lateral direction (sideways or Y-axis in the platform reference system) but limited to or primarily forwards and backwards in the line with the direction of motion 50 (which is the X-axis in the platform reference system) and up and down (which is the Z-axis in the platform reference system). Since the intermediary acceleration measurements are represented in the platform reference system, the processor 150 may zero or attenuate the sideways component (Y-axis) of the data leaving only the forward component (X-axis) and the vertical component (Z-axis), thereby resulting in constrained acceleration measurements in the platform reference system.

This step may be altered by determining a mean sideways value over time and adjusting the sideways component by this mean value. In this way, a sideways calibration error along the Y-axis (in the platform reference system) of the accelerometer 110 is eliminated or reduced.

At 230, the processor 150 receives the constrained acceleration measurements in the platform reference system. The second rotation matrix ($C_{LRS \leftarrow PRS}$) is a means for converting data between the platform reference system and the local reference system. Using the second rotation matrix ($C_{LRS \leftarrow PRS}$) found in memory 140, the processor 150 converts the constrained acceleration measurements from the platform reference system to the local reference system.

At 240, a gravitational component or gravitational vector, which represents effects due to gravity, is removed from the constrained acceleration measurements to result in constrained acceleration measurements without gravity. In a sense, the processor 150 uses the gravitational vector to null an effect of gravity in the acceleration measurements. The gravitational vector may be determined using a low-pass filter or long-term averaging of the constrained acceleration measurements in the local reference system. Gravity is not removed in the platform reference system because the vehicle may not be situated flat in the horizontal plane (i.e., a non-zero road slope). As such, the Z-axis in the platform reference system may not represent the true direction of gravity. Once the gravitational vector is removed, the non-gravity vertical acceleration and the forward/backwards acceleration remains.

At 250, the processor 150 performs a double integration on the constrained acceleration measurements in the local reference system to result in an accelerometer-based linear displacement value, which may be used for dead reckoning. For example, the double-integration operation may result in an estimated direction or heading and a travel distance. The processor 150 may perform these steps 200 to 250 with a period of a few milliseconds so the determined travel distance and rotation represents the distance traveled and rotation occurring during those few milliseconds. The estimated length and direction may be accumulated with a previous position or previous estimated position to result in an estimated current position.

At 260, a traditional conversion is shown. Unlike steps 200-250 of the present invention, which uses two rotation matrices and nonholonomic constraints, known systems only use the third rotation matrix ($C_{LRS \leftarrow BRS}$) to directly convert the raw acceleration measurements from the body reference system to the local reference system. In this known case, the acceleration measurements are not constrained at an intermediate step and only a single rotation matrix is used.

In accordance with embodiments of the present invention, raw measurements are converted from the body reference system to the platform reference system (using the first rotation matrix ($C_{PRS \leftarrow BRS}$) where nonholonomic constrains are imposed, and then converted from the platform reference system (using the second rotation matrix ($C_{LRS \leftarrow PRS}$)) to the local reference system where the converted measurements undergo a double integration. Whenever the PND 1000 is adjusted in its mount, both the first rotation matrix ($C_{PRS \leftarrow BRS}$) and third rotation matrix ($C_{LRS \leftarrow BRS}$) must be updated or reinitialized. Whenever the vehicle 10 makes a turn, the second rotation matrix ($C_{LRS \leftarrow PRS}$) and third rotation matrix ($C_{LRS \leftarrow BRS}$) are updated (e.g., using gyrometer measurements).

FIGS. 6, 7, 8, 9 and 10 relate the rotation matrices, pairs of reference vectors and reference systems, in accordance with embodiments of the present invention. The pairs of reference vectors are used in the solution to Wahba's problem. This algorithm uses a common pair of reference vectors but in two different reference systems as four input values. Each of the four input values may be a single vector or may be a statistical set of vectors. The four single vectors may be applied to obtain a solution to Wahba's problem. Alternatively, one to four statistical sets of vectors may replace the corresponding single vector. The output value of Wahba's problem is first, second or third rotation matrices. Alternatively, a least-squares algorithm may be applied to the statistical set of vectors to form a rotation matrix.

Figures 6, 7:
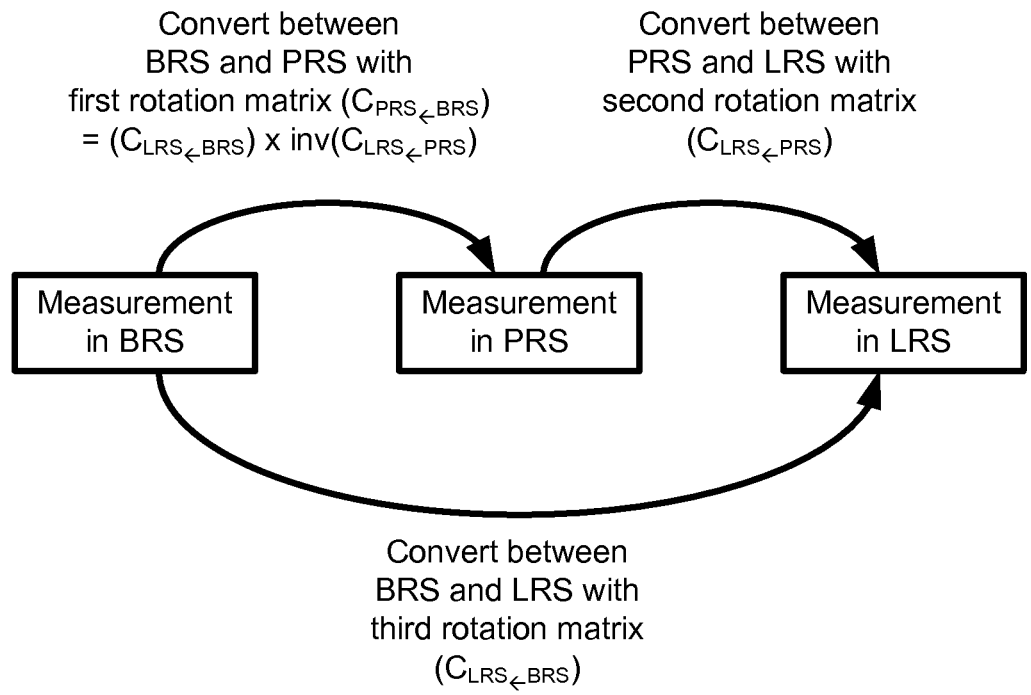
FIGS. 6 and 7 relate the rotation matrices, reference vectors and reference systems, in accordance with embodiments of the present invention.

In FIG. 6, various rotation matrices are used to convert measurements between various reference systems. Measurements in the body reference system may be converted to the platform reference system with a first rotation matrix ($C_{PRS \leftarrow BRS}$). The first rotation matrix ($C_{PRS \leftarrow BRS}$) represents the relative orientation between the PND 1000 and the vehicle 10. As long as the PND 1000 is not adjusted in its mount, the first rotation matrix ($C_{PRS \leftarrow BRS}$) stays constant. However, once the PND 1000 is adjusted relative to the vehicle 10, the first rotation matrix ($C_{PRS \leftarrow BRS}$) must be either updated or reinitialized.

Measurements in the platform reference system may be converted to the local reference system using a second rotation matrix ($C_{LRS \leftarrow PRS}$). The second rotation matrix represents the relative orientation between the vehicle 10 and the Earth. Whenever the vehicle 10 turns, the second rotation matrix ($C_{LRS \leftarrow PRS}$) is updated (e.g., using gyrometer measurements). Thus, the second rotation matrix ($C_{LRS \leftarrow PRS}$) is often updated when the vehicle 10 is traveling.

For completeness, measurements in the body reference system could be converted to the local reference system using a third rotation matrix ($C_{LRS \leftarrow BRS}$). The third rotation matrix ($C_{LRS \leftarrow BRS}$) will be updated whenever the PND 1000 is adjusted in its mount or vehicle 10 makes a turn.

To convert measurements in the opposite direction, an inverse of the conversion may be used. For example, an inverse of the first rotation matrix ($C_{BRS \leftarrow PRS}=\text{INV}(C_{PRS \leftarrow BRS})$) may be used to convert measurements from the platform reference system to the body reference system. Similarly, an inverse of the second rotation matrix ($C_{PRS \leftarrow LRS}=\text{INV}(C_{LRS \leftarrow PRS})$) may be used to convert measurements from the local reference system to the platform reference system. Likewise, an inverse of the third rotation matrix ($C_{BRS \leftarrow LRS}=\text{INV}(C_{LRS \leftarrow BRS})$) may be used to convert measurements from the local reference system to the body reference system.

In general, any of the three rotation matrices may be formed with a combination of the other two rotation matrices. For example, the first rotation matrix may be formed by ($C_{PRS \leftarrow BRS}$)=($C_{LRS \leftarrow BRS}$)*INV($C_{LRS \leftarrow PRS}$), the second rotation matrix may be formed by ($C_{LRS \leftarrow PRS}$)INV($C_{PRS \leftarrow BRS}$)×($C_{LRS \leftarrow BRS}$), and the third rotation matrix may be formed by ($C_{LRS \leftarrow BRS}$)=($C_{PRS \leftarrow BRS}$)×($C_{LRS \leftarrow PRS}$).

With the appropriate pairs of input vectors in the proper reference system, each of these rotation matrices may be solved by Wahba's problem.

In FIG. 7, a table summarizes the mathematical correspondence among the three reference vector pairs. The first reference vector in each pair is the direction of gravity ($\vec{g}$). The second reference vector in each pair is the direction of travel ($\vec{D}$).

In the body reference system, the first reference vector is identified as the gravitational vector ($\vec{g}_{BRS}$) and the second reference vector identified is the direction vector ($\vec{D}_{BRS}$). In the trivial case where the PND 1000 happens to be positioned perfectly standing up, pointing directly forward and traveling in a vehicle 10 going straight and flat, the gravitational vector ($\vec{g}_{BRS}$) may be in line with the Y-axis in the body reference system and the direction vector ($\vec{D}_{BRS}$) may be in line with the Z-axis in the body reference system.

In the platform reference system, the first reference vector is the gravitational vector ($\vec{g}_{PRS}$) is along the vertical Z-axis of the vehicle 10 offset by the road slope and the second reference vector is X-axis or the direction vector ($\vec{D}_{PRS}$) of the vehicle 10. Finally, in the local reference system, the first reference vector is up/down or along the Z-axis or the gravitational vector ($\vec{g}_{LRS}$) and the second reference vector is the direction vector ($\vec{D}_{LRS}$), which is the traveling direction of the vehicle 10 and may be set with the GPS velocity vector or by map matching to a road direction.

In performing embodiments of the present invention, several challenges may exist. A first challenge is to accurately determine a gravitational vector, which is used as a basis for several of the computations described below and is described further with reference to FIG. 8. A second challenge is to accurately determine a second rotation matrix ($C_{LRS \leftarrow PRS}$), which is applied above at step 220 (FIG. 5) and is described further below with reference to FIGS. 9 and 10. A third challenge is to accurately determine a third rotation matrix ($C_{LRS \leftarrow BRS}$), which is used to compute a first rotation matrix ($C_{PRS \leftarrow BRS}$), and is described further below with reference to FIGS. 11 and 12. A fourth challenge is to compute a first rotation matrix ($C_{PRS \leftarrow BRS}$), derived from the second rotation matrix ($C_{LRS \leftarrow PRS}$) and a third rotation matrix ($C_{LRS \leftarrow BRS}$), which is used above at step 205 (FIG. 5) and is described further below with reference to FIG. 13. A fifth challenge is to maintain updated rotation matrices, which is described further below with reference to FIG. 14. A sixth challenge is to update gyrometer calibrations, which is described further below with reference to FIG. 15. A seventh challenge is to determine when a PND 1000 has been repositioned it a mount within a vehicle 10, which invalidates the first rotation matrix ($C_{PRS \leftarrow BRS}$) and the third rotation matrix ($C_{LRS \leftarrow BRS}$), and trigger a new initialization of these rotation matrices, which is described further below beginning at FIG. 16.

Solution to the First Challenge:

The first challenge is to accurately determine a gravitational vector, which is used as a basis for several of the computations described below and is described further with reference to FIG. 8.

To find the gravitational vector with respect to the body reference system, a typical device averages acceleration measurements in the body reference system over time, which occurs independent of being either stationary or moving. With time, the non-gravitational acceleration due to a device's movement cancels and sums to zero, thus the remaining component of acceleration after long-term averaging is gravity alone. If the device remains in a constant orientation with respect to Earth, then this gravitational vector is accurate. If the device is reoriented with respect to Earth, however, then the long-term averaging destructively combines the gravitational components and this gravitational vector becomes inaccurate. Also, if the device is reoriented, the first rotation matrix is also inaccurate. To alleviate this inherent problem of a reoriented device upsetting the accuracy of gravitational and the first rotation matrix, a sequence of images from a camera 100 may be used, as described below.

Figure 8:
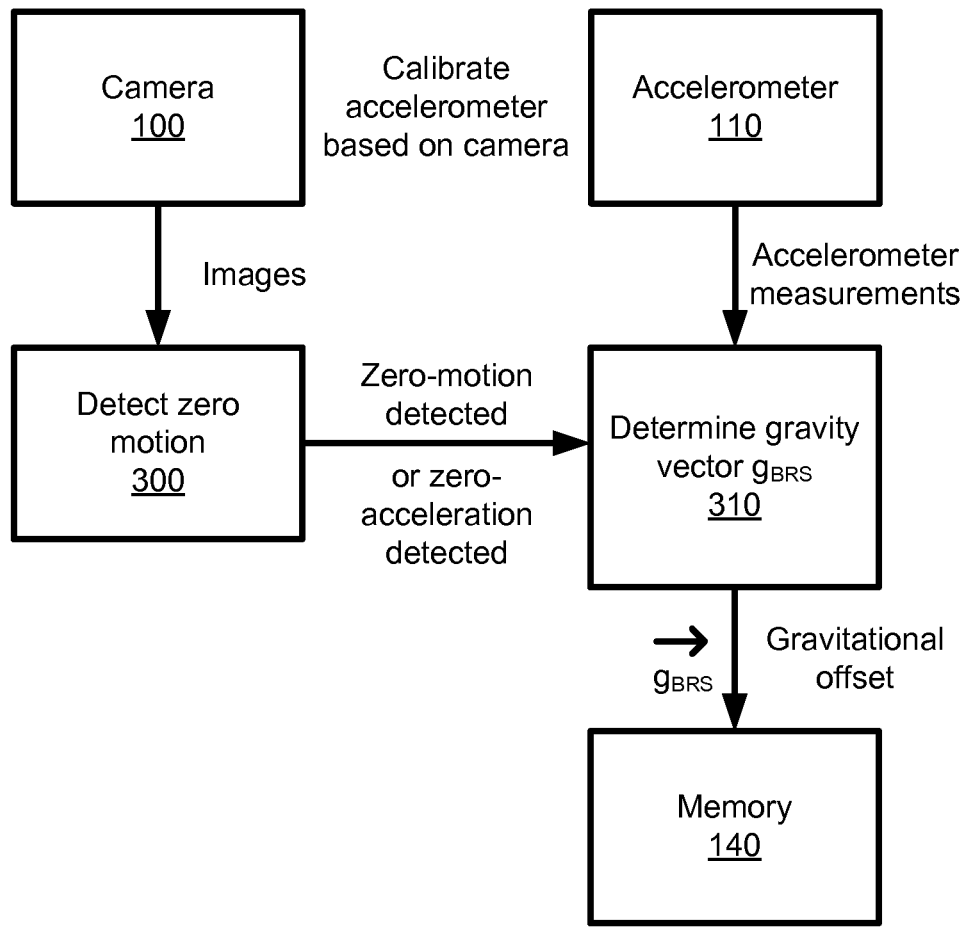
FIG. 8 shows a processor for setting an initial gravitational vector, in accordance with embodiment of the present invention.

FIG. 8 shows a process for setting an initial gravitational vector, in accordance with embodiment of the present invention. A processor 150 determines a gravitational calibration based on images from the camera 100.

At 300, the processor 150 receives multiple images and uses the images to determine when the PND 1000 is in a zero-motion state. For example, a pair of time-sequenced images (or multiple pairs of time-sequenced images) may be contrasted or subtracted pixel by pixel to determine whether the images were captured from different locations, thereby indicating the PND 1000 is undergoing motion. Alternatively, continues images may be captured in a single camera image over time. The time-lapsed image may be analyzed to determine if any blurring exists and if this blurring is the result of motion. A time-lapsed image effectively includes a continuous sequence of images, which appears as a blurring from the first image in the continuous sequence of images to the last image in the continuous sequence of images. The processor 150 may determine no motion exists based on a single zero-motion detection or an averaged or otherwise filtered sequence of zero-motion detections.

Alternatively, a processor 150 may determine of a zero-acceleration state exists. A zero-acceleration state occurs when the PND 1000 only experiences the acceleration due to gravity and may be still or moving. With this looser standard, the PND 1000 is traveling at a constant velocity therefore is not undergoing any linear or angular acceleration. A sequence three or more time-spaced images may be used to determine if the PND 1000 is traveling in a constant direction at a constant speed. For example, a processor 150 may analyze an FOE point 20 and natural features common to three consecutive images. If the processor 150 determines the FOE point 20 remains at a constant spot in each image then the PND 1000 is not experiencing angular acceleration due to a turn. If the processor 150 determines the natural features are progressing as expected with a constant speed, then the PND 1000 is not experiencing linear acceleration due to speeding up or slowing down.

At 310, if no motion is detected (or alternatively, no non-gravity acceleration), the processor 150 may set the gravitational vector ($\vec{g}_{BRS}$) to be equal to the current accelerometer measurements. The processor 150 may average a series of such acceleration values to determine the gravitational vector ($\vec{g}_{BRS}$) based on a corresponding series of zero-motion detections. That is, if the PND 1000 is determined not to be moving over a period of time, the accelerometer measurements may be averaged over this period of time to determine an averaged gravitational vector ($\vec{g}_{BRS}$).

The processor 150 may determine the gravitational vector ($\vec{g}_{PRS}$) in the platform reference system by using the vehicle's vertical axis (Z-axis) offset by the road slope. The processor 150 defines the gravitational vector ($\vec{g}_{LRS}$) in the local reference system by using the up/down axis of the local reference system.

Each of the gravitational vectors ($\vec{g}_{BRS}$), ($\vec{g}_{PRS}$) and ($\vec{g}_{LRS}$) may be saved to memory 140 for future use. In the manner described above, the processor 150 determines an initial value of a gravitational vector based on the sequence of images. The gravitational vector may later be used to null the effects of gravity from the acceleration measurements as described above with reference to step 210 (FIG. 5) and may be used as input vectors to Wahba's problem as described below.

Figure 9:
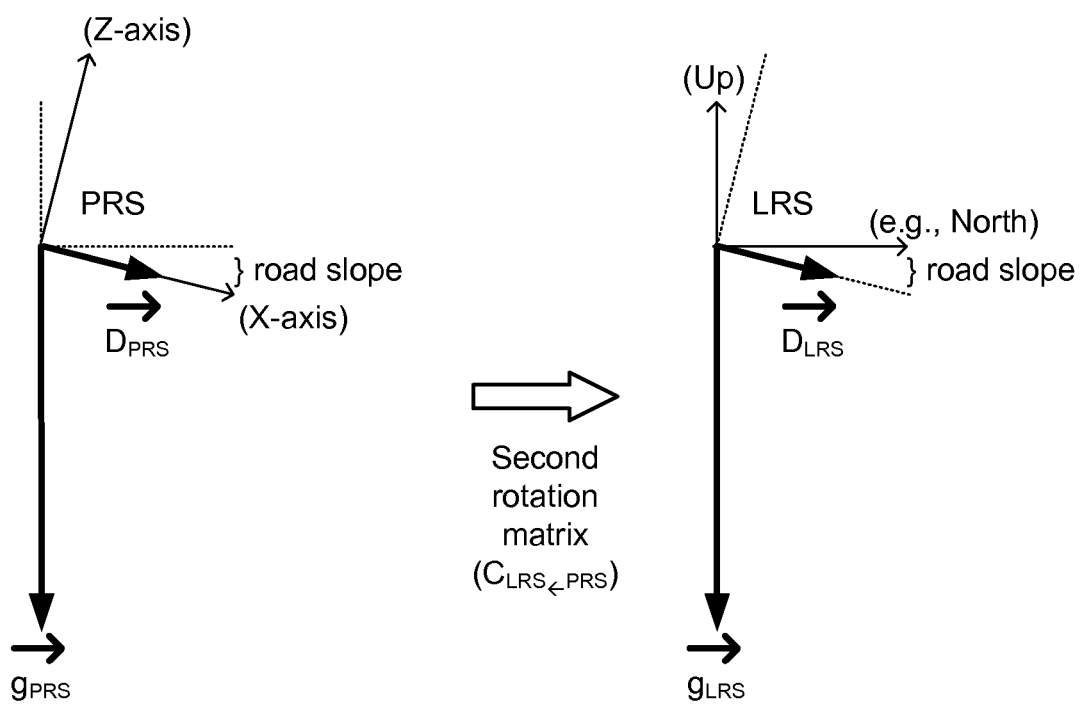
FIGS. 9-10 applies Wahba's problem to pairs of vectors for setting an initial first rotation matrix, in accordance with embodiments of the present invention.
Figure 10:
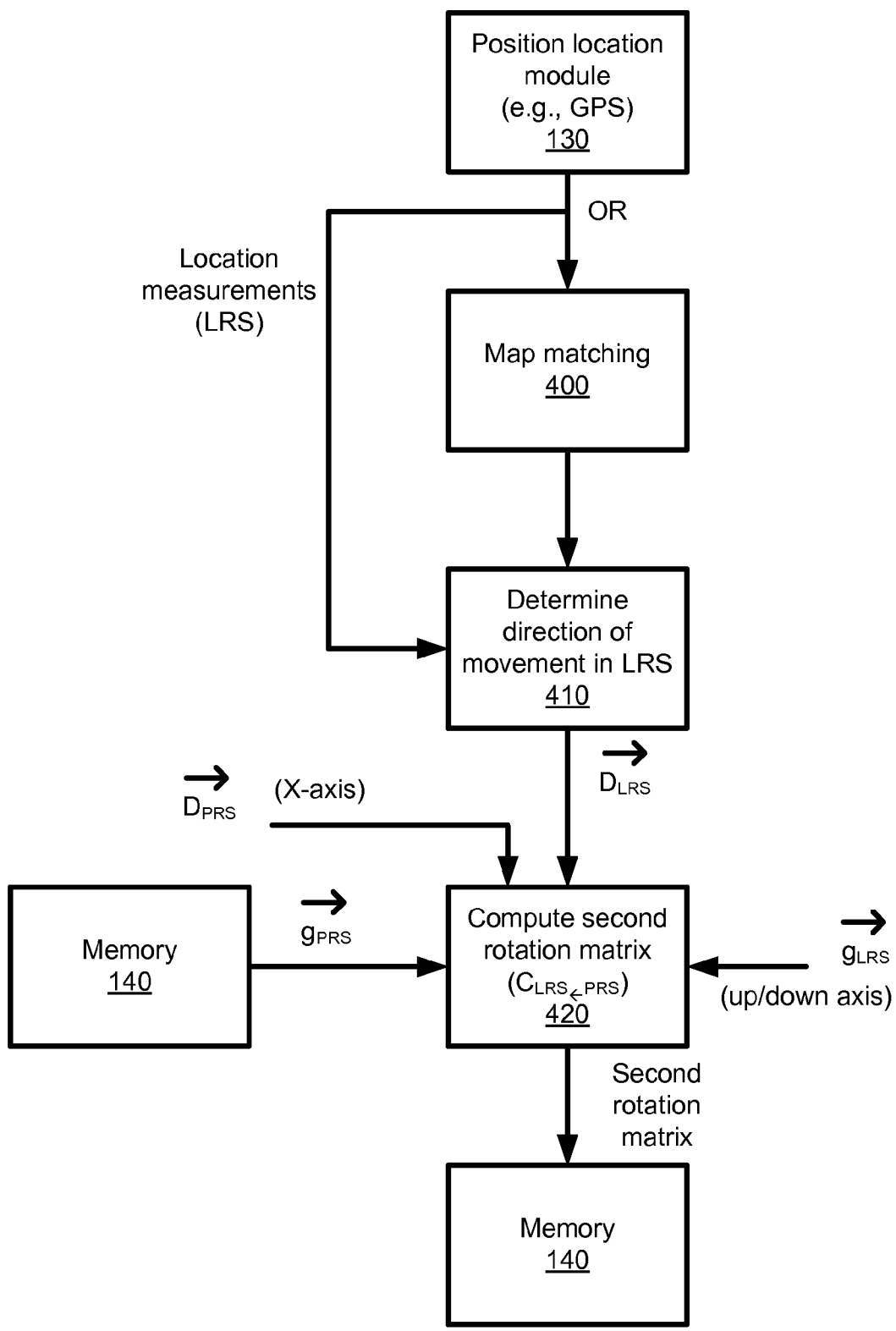

Solution to the Second Challenge:

The second challenge is to accurately determine a second rotation matrix ($C_{LRS \leftarrow PRS}$), which is applied above at step 220 (FIG. 5) and is described further below with reference to FIGS. 9 and 10. FIGS. 9 and 10 apply Wahba's problem to pairs of vectors for setting an initial second rotation matrix ($C_{LRS \leftarrow PRS}$), in accordance with embodiments of the present invention.

In FIG. 9, Wahba's problem is applied to a first pair of reference vectors from the platform reference system and a second pair of reference vectors from the local reference system. Again, the first reference vector in each pair is the direction of gravity ($\vec{g}$) and the second reference vector in each pair is the direction of travel ($\vec{D}$). Specifically, in the platform reference system, the first reference vector is the gravitational vector ($\vec{g}_{PRS}$) and the second reference vector is the direction vector ($\vec{D}_{PRS}$), and in the local reference system, the first reference vector is the gravitational vector ($\vec{g}_{LRS}$) and the second reference vector is the direction vector ($\vec{D}_{LRS}$).

The gravitational vector ($\vec{g}_{PRS}$) in the platform reference system may be assumed from a long-term averaging of the accelerometer measurements since on average the vehicle's slope is zero. That is, over the long term, the vehicle 10 goes uphill and downhill or is tilted left, right, up and down approximately the same amount of time. The direction vector ($\vec{D}_{PRS}$) in the platform reference system is the X-axis of the vehicle 10.

The gravitational vector ($\vec{g}_{LRS}$) in the local reference system is defined as the vertical axis (i.e., altitude axis or up/down axis) in the local reference system. The direction vector ($\vec{D}_{LRS}$) in the local reference system is determined, for example, from GNSS or GPS signals.

These two pairs of reference vectors are used to find the second rotation matrix ($C_{LRS \leftarrow PRS}$). Note that the pair of reference vectors is not orthogonal if there is a non-zero road slope. The reference vectors may be normalized by the un-normalized reference vector's magnitude to form a unity reference vector. This algorithm to correlate two pairs of reference vectors in two reference systems and result in a rotation matrix is referred to a solution to Wahba's problem and the second rotation matrix ($C_{LRS \leftarrow PRS}$) is formed by applying Wahba's problem.

FIG. 10 shows the process for a processor 150 to form the second rotation matrix ($C_{LRS \leftarrow PRS}$). The position location module 130 provides location measurements in the local reference system. The location measurements may be GNSS satellite information (such as GPS information). Optionally, at 400, the processor 150 uses a map-matching algorithm to constrain location measurements from the position location module 130. At 410, the processor 150 determines a movement vector ($\vec{D}_{LRS}$) in the local reference system based directly on the location measurements from the position location module 130 or based on the constrained location measurements from map matching.

At 420, the processor 150 accepts the gravitational vector ($\vec{g}_{PRS}$) and the direction vector ($\vec{D}_{PRS}$) in the platform reference system and the gravitational vector ($\vec{g}_{LRS}$) and the direction vector ($\vec{D}_{LRS}$) in the local reference system. These vectors may be saved to memory 140 for later use. The processor 150 may assume the direction vector ($\vec{D}_{PRS}$) is in line with the X-axis in the platform reference system. The processor 150 may also assume the gravitational vector ($\vec{g}_{LRS}$) is in line with the up/down axis in the local reference system. A solution to Wahba's problem applies these four vectors to compute a second rotation matrix ($C_{LRS \leftarrow PRS}$), which is saved to memory 140. In this manner, an initial second rotation matrix ($C_{LRS \leftarrow PRS}$) is determined.

Figure 11:
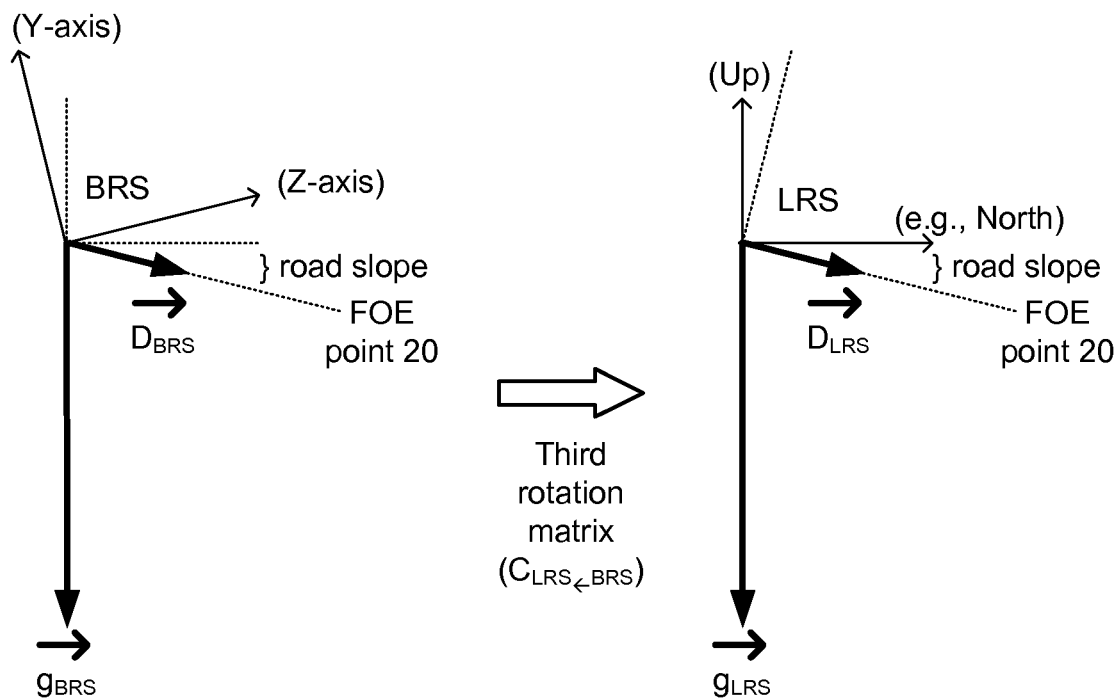
FIGS. 11-12 applies Wahba's problem to pairs of vectors for setting an initial second rotation matrix, in accordance with embodiments of the present invention.

Solution to the Third Challenge:

The third challenge is to accurately determine a third rotation matrix ($C_{LRS \leftarrow BRS}$), which is used to compute a first rotation matrix ($C_{PRS \leftarrow BRS}$), and is described further below with reference to FIGS. 11 and 12. In FIG. 11, Wahba's problem is applied again to a first pair of reference vectors from the body reference system and a second pair of reference vectors from the local reference system. In the body reference system, the first reference vector is the gravitational vector ($\vec{g}_{BRS}$) and the second reference vector identified is the direction vector ($\vec{D}_{BRS}$). In the local reference system, the first reference vector is the gravitational vector ($\vec{g}_{LRS}$) and the second reference vector is the direction vector ($\vec{D}_{LRS}$). The pairs of reference vectors are not orthogonal if the vehicle 10 is on a road slope.

Figure 12:
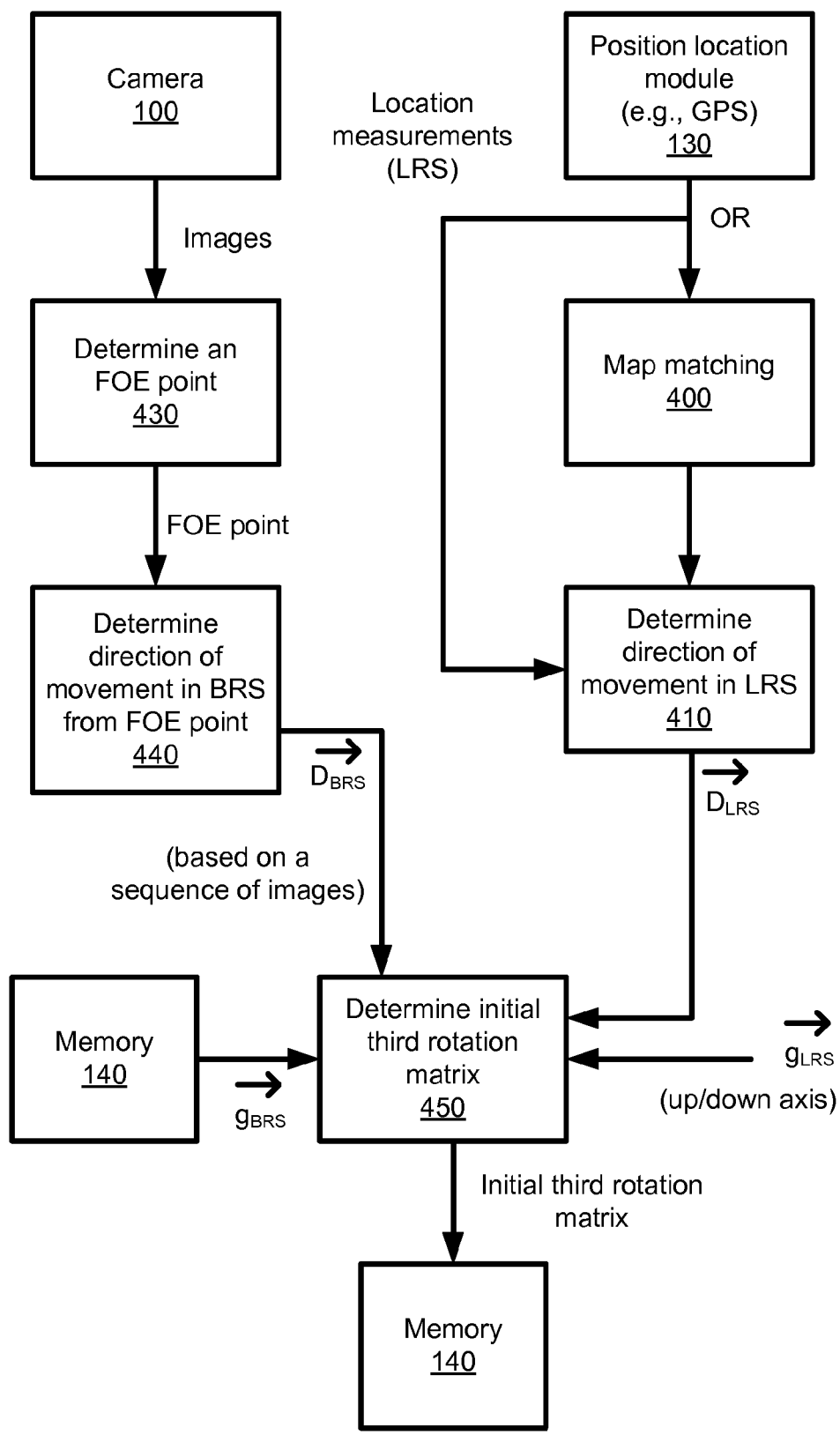

FIG. 12 shows the process for a processor 150 to form the third rotation matrix ($C_{LRS \leftarrow BRS}$). Again, the direction vector ($\vec{D}_{LRS}$) in the local reference system is formed as described above in FIG. 10 at optional step 400 and step 410.

At 430, the processor 150 captures a sequence of images from camera 100 and determines an FOE point 20. At 440, the processor 150 defines the direction vector ($\vec{D}_{BRS}$) in the body reference system from the FOE point 20. In this manner, the direction vector ($\vec{D}_{BRS}$) is determined based on a sequence of images.

At 450, the processor 150 accepts the gravitational vector ($\vec{g}_{BRS}$) and the direction vector ($\vec{D}_{BRS}$) in the body reference system and the gravitational vector ($\vec{g}_{LRS}$) and the direction vector ($\vec{D}_{LRS}$) in the local reference system. These vectors may be saved to memory 140 for later use. The processor 150 may assume the gravitational vector ($\vec{g}_{LRS}$) is in line with the up/down axis in the local reference system. A solution to Wahba's problem applies these four vectors to compute a third rotation matrix ($C_{LRS \leftarrow BRS}$), which is saved to memory 140. In this manner, an initial third rotation matrix ($C_{LRS \leftarrow BRS}$) is determined.

Figure 13:
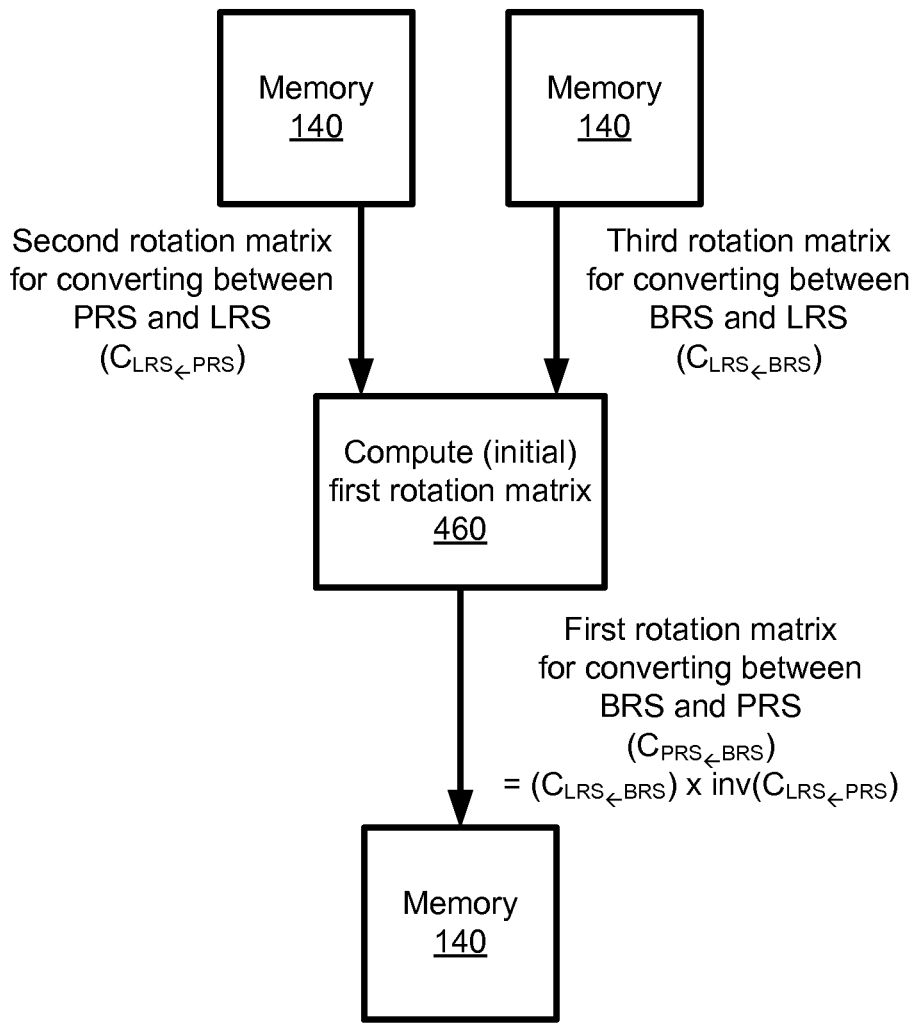
FIG. 13 show data flow diagrams for computing an initial first rotation matrix, in accordance with embodiments of the present invention.

Solution to the Fourth Challenge:

The fourth challenge is to compute a first rotation matrix ($C_{PRS \leftarrow BRS}$), derived from the second rotation matrix ($C_{LRS \leftarrow PRS}$) and a third rotation matrix ($C_{LRS \leftarrow BRS}$), which is used above at step 200 (FIG. 5) and is described further below with reference to FIG. 13. At 460, the processor 150 retrieves the second rotation matrix ($C_{LRS \leftarrow PRS}$) and a third rotation matrix ($C_{LRS \leftarrow BRS}$) from memory 140. The processor 150 computes a matrix inverse of the second rotation matrix ($C_{LRS \leftarrow PRS}$) to form $\{C_{PRS \leftarrow LRS} = \text{INV}(C_{LRS \leftarrow PRS})\}$. The processor 150 then computes the matrix product of the third rotation matrix ($C_{LRS \leftarrow BRS}$) and the matrix inverse of the second rotation matrix ($C_{LRS \leftarrow PRS}$) to form the first rotation matrix ($C_{PRS \leftarrow BRS}$) as $\{(C_{PRS \leftarrow BRS}) = (C_{LRS \leftarrow BRS}) * \text{INV}(C_{LRS \leftarrow PRS})\}$.

Solution to the Fifth Challenge:

The fifth challenge is to maintain updated rotation matrices, which is described further below with reference to FIG. 14.

The second rotation matrix ($C_{LRS \leftarrow PRS}$) must be updated whenever the relative orientation between the PND 1000 and the vehicle 10 changes (e.g., when a user adjusts the PND 1000 resting in a mount). If the PND 1000 has not been moved, then the second rotation matrix ($C_{LRS \leftarrow PRS}$) does not need to be updated. Similarly, whenever the vehicle 10 turns or changes inclination, the third rotation matrix ($C_{LRS \leftarrow BRS}$) must be updated. In a normal scenario, the second rotation matrix ($C_{LRS \leftarrow PRS}$) needs rare updating but the third rotation matrix ($C_{LRS \leftarrow BRS}$) must be continually updated. When either the second or third rotation matrices are updated, the first rotation matrix ($C_{PRS \leftarrow BRS}$) must also be updated by following the procedure outline described above with reference to FIG. 13.

Figure 14:
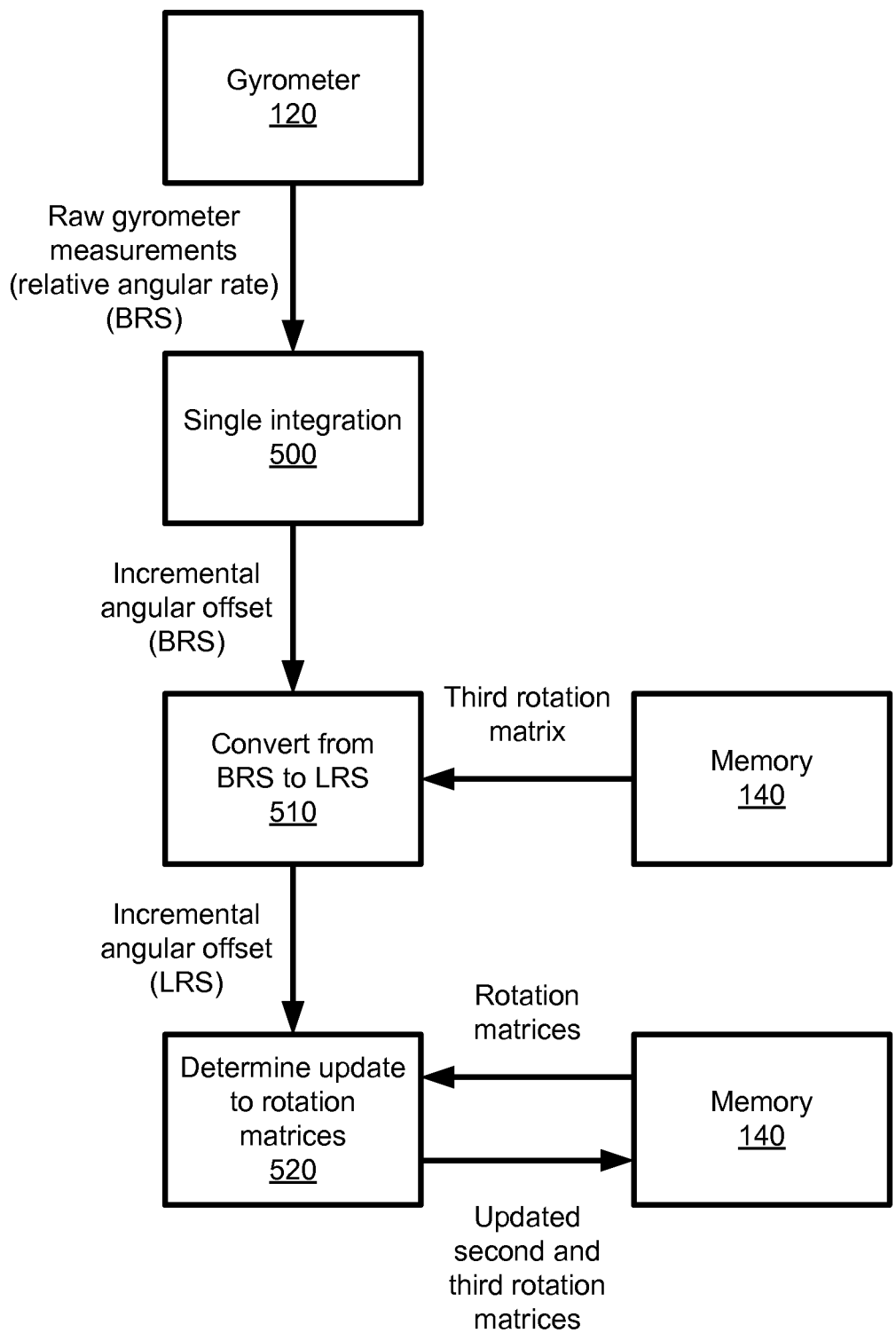
FIG. 14 show data flow diagrams for updating a second rotation matrix and a third rotation matrix, in accordance with embodiments of the present invention.

FIG. 14 shows a data flow diagrams for updating the first, second and third rotation matrices, in accordance with embodiments of the present invention. The processor 150 updates the second and/or third rotation matrices based on the gyrometer measurements and recalculates the first rotation matrix ($C_{PRS \leftarrow BRS}$), based on an update either the second rotation matrix ($C_{LRS \leftarrow PRS}$) or the third rotation matrix ($C_{LRS \leftarrow BRS}$).

At this point, the processor 150 has already determines that the first rotation matrix ($C_{PRS \leftarrow BRS}$) is still valid (i.e., the PND 1000 has not moved relative to the vehicle 10). At 500, the processor 150 receives raw gyrometer measurements in the body reference system from the gyrometer 120 and performs a single integration to result in an incremental angular offset in the body reference system. The incremental angular offset represents an angular change of the body with reference to the local reference system occurring over the duration of the gyrometer measurements. That is, if the relative orientation between the PND 1000 and the vehicle 10 has not changed, then the incremental angular offset is entirely due to vehicle movement in the local reference system.

At 510, the processor 150 retrieves the third rotation matrix ($C_{LRS \leftarrow BRS}$) from memory 140 and converts the incremental angular offset from the body reference system to the local reference system.

At 520, the processor 150 uses the incremental angular offset in the local reference system to rotate the second rotation matrix ($C_{LRS \leftarrow PRS}$) in memory 140 to form an updated second rotation matrix ($C_{LRS \leftarrow PRS}$). Similarly, the processor 150 may uses the incremental angular offset to rotate the third rotation matrix ($C_{LRS \leftarrow BRS}$) or alternatively, compute a matrix product of the first rotation matrix ($C_{PRS \leftarrow BRS}$) and the second rotation matrix ($C_{LRS \leftarrow PRS}$) to form the updated third rotation matrix ($C_{LRS \leftarrow BRS}$). The resulting updated second rotation matrix ($C_{LRS \leftarrow PRS}$) and updated third rotation matrix ($C_{LRS \leftarrow BRS}$) now represents their previous rotation plus the incremental angular offset. The processor 150 then saves the updated second rotation matrix ($C_{LRS \leftarrow PRS}$) and updated third rotation matrix ($C_{LRS \leftarrow BRS}$) to memory 140.

Figure 15:
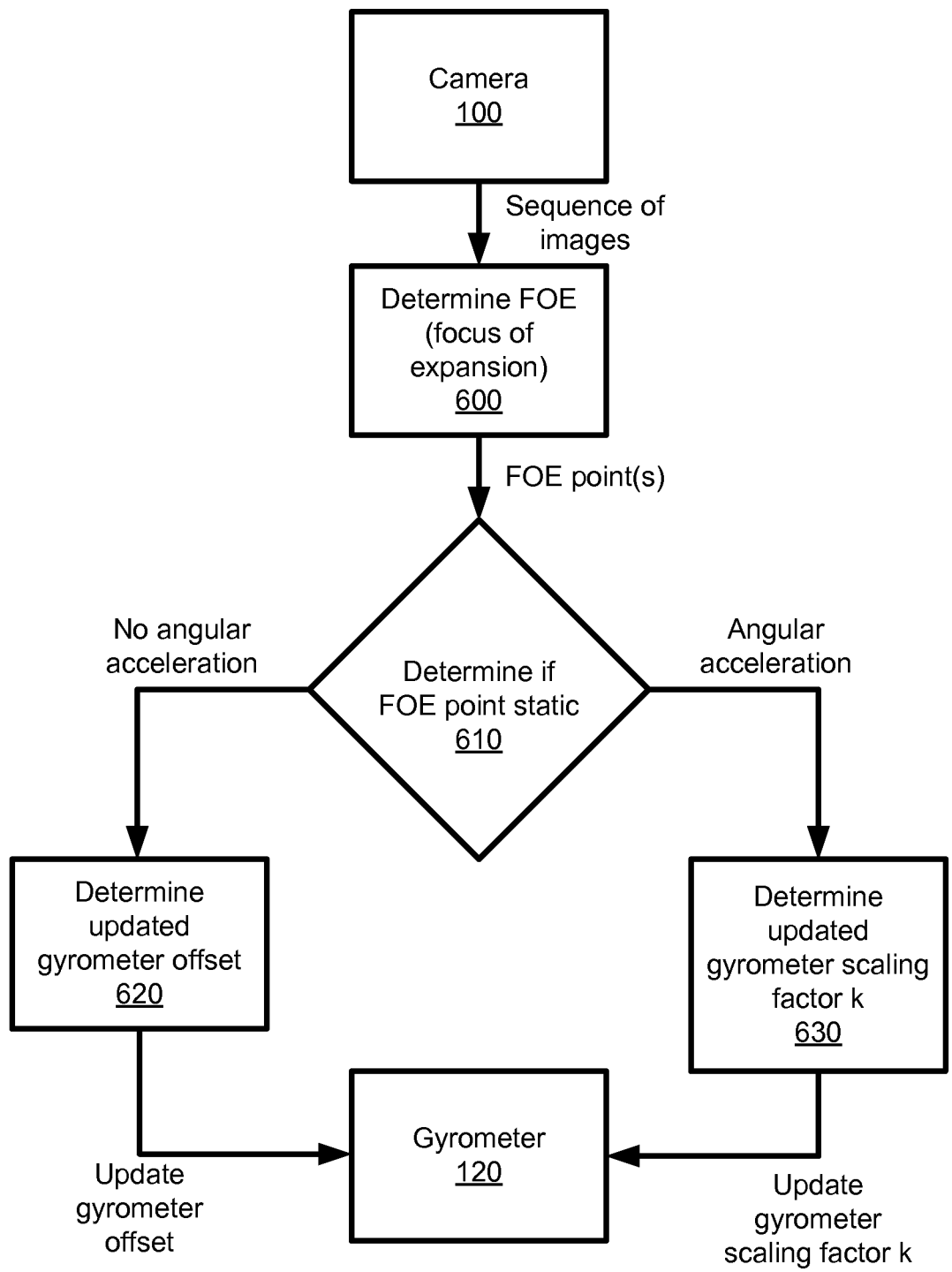
FIG. 15 shows a data flow diagram for updating gyrometer calibration, in accordance with embodiments of the present invention.

Solution to the Sixth Challenge:

A sixth challenge is to update gyrometer calibrations, which is described further below with reference to FIG. 15. In FIG. 15, a data flow diagram is shown for updating the gyrometer calibration parameters, in accordance with embodiments of the present invention. The processor 150 updates calibration of the gyrometer 120 based on the sequence of images from the camera 100. In this manner, the gyrometer 120 is functionally coupled to the camera 100. In other words, images from the camera 100 are used to calibrate the gyrometer 120.

At 600, the processor 150 receives a sequence of images from the camera 100. The processor 150 determines an FOE point 20, for example, by comparing movement of features between pairs of images. Over the sequence of images, the processor 150 may determine one or multiple FOE points 20.

At 610, the processor 150 determines whether the FOE points 20 are static. That is, the processor 150 compares the determined FOE points 20 to check if the points are clustered close enough to represent a single FOE point 20. If the FOE points 20 are clustered close enough to represent a single FOE point 20, then the PND 1000 is traveling in a straight line. In this case, the PND 1000 is in motion and may be at a constant speed, accelerating or decelerating, however, there is no or little angular acceleration. On the other hand, if the FOE points 20 are spread outside of a single fixed area, then the PND 1000 is undergoing an angular acceleration (e.g., turning to the right).

At 620, the processor 150 determines that the PND 1000 is not undergoing angular acceleration and then determines a gyrometer offset ($Offset_{UPDATE}$). The gyrometer offset represents the erroneous angular rotation reported by the gyrometer 120 when the actual angular rotation should be zero. That is, any rotation reported by the gyrometer 120 is only due to the miss calibration of the gyrometer 120. The gyrometer 120 uses the gyrometer offset to compensate and calibrate future measurements. That is, the gyrometer 120 combines its existing offset ($Offset_{EXISTING}$) with the updated offset to result in a new offset ($Offset_{NEW}$) to form the updated gyrometer offset ($Offset_{UPDATE}$) with the aim that future gyrometer measurements report no angular rotation when the PND 1000 is not rotating (e.g., $Offset_{NEW} = Offset_{EXISTING} - Offset_{UPDATE}$). In some embodiments, the offset adjusted in three dimensions simultaneously with a 3-D vector. In other embodiments, the offset is adjusted in each dimension separately.

At 630, the processor 150 determines the PND 1000 is undergoing an angular acceleration that is not due to the PND 1000 being adjusted in its mount. First, the processor 150 determines the angular acceleration based on the sequence of images. Second, the processor 150 determines the angular acceleration from gyrometer measurements from the gyrometer 120. Third, the processor 150 compares the angular acceleration based on the images with the angular acceleration from the gyrometer measurements. The processor 150 may then compute a ratio of these two accelerations. For example, the ratio may be k=gyrometer angular acceleration/image angular acceleration), where k is a gyrometer scaling factor. The gyrometer scaling factor k represents rotation errors introduced by the gyrometer 120. A value of k=1 represents no error between the image angular acceleration and the gyrometer angular acceleration. A value of 1.1 represents the gyrometer 120 is too fast by 10%. The processor 150 sends this scaling factor k to the gyrometer 120, which may combine it with its existing scaling factor to result in a new scaling factor (e.g., $k_{NEW} = K_{OLD}/k$). In some embodiments, the scaling factor adjusted in three dimensions simultaneously with a 3-D vector. In other embodiments, the scaling factor is adjusted in each dimension separately. In this manner as described in 600-630, the processor 150 updates the gyrometer calibration values (offset and scaling factor) based on the sequence of images captured from the camera 100.

FOE points 20 are determined using feature tracking. By tracking movement from image to image of multiple features, the processor 150 may determine one or more FOE points 20. Based on how a FOE point 20 progresses from sequential pairs of images, the processor 150 may determine if the PND 1000 has moved relative to the vehicle 10 (thus, the first rotation matrix needs to be updated) or if the vehicle 10 has moved (thus, the second and third rotation matrices need to be updated). The figures below describe processing of features and FOE points.

Solution to the Seventh Challenge:

A seventh challenge is to determine when a PND 1000 has been repositioned it a mount within a vehicle 10, which invalidates the first rotation matrix ($C_{PRS \leftarrow BRS}$) and the third rotation matrix ($C_{LRS \leftarrow BRS}$), and trigger a new initialization of these rotation matrices, which is described further below beginning at FIG. 16. Once mount movement has been detected, the third rotation matrix ($C_{LRS \leftarrow BRS}$) is initialized as described above with reference to FIGS. 11 and 12, and the first rotation matrix ($C_{PRS \leftarrow BRS}$) is initialized as described above with reference to FIG. 13.

The processor 150 determines whether the PND 1000 has been moved based on movement of the FOE point 20. If the FOE point 20 moves from a static point to a new static point, then the PND 1000 has been adjusted. If the FOE point 20 transitions from this static point across the camera's view and back to the original FOE point 20, then the vehicle 10 has transitioned from straight-line driving to a turn and back to straight-line driving. Also, if the processor 150 determines the PND 1000 has experienced a roll, then the PND 1000 has been moved in its mount. In some embodiments, a processor 150 sets or updates the first rotation matrix ($C_{PRS \leftarrow BRS}$) and the third rotation matrix ($C_{LRS \leftarrow BRS}$), if the PND 1000 shows both movement of the FOE point between static points and the PND 1000 has experienced a roll. That is, the processor 150 requires both detection of a new static FOE point 20 and detection of a roll. In other embodiments, a processor 150 sets or updates the first rotation matrix ($C_{PRS \leftarrow BRS}$) and the third rotation matrix ($C_{LRS \leftarrow BRS}$), if the processor 150 determines either movement of the FOE point between static points or the PND 1000 has experienced a roll.

FIGS. 16, 17, 18, 19, 20, 21 and 22 show features relative to one another, in accordance with embodiments of the present invention. The processor 150 receives a sequence of images. For each pair of images, the processor 150 identifies and extracts one or more natural features from a first image thereby defining a corresponding number of points. The processor 150 then correlates these features to a second image. In some embodiments, the processor 150 extracts features from each image. In these embodiments, the second image of the pair becomes the first image of the next pair during the next iteration. In other embodiment, the processor 150 extracts features from every other image. In this manner, pairs of images do not overlap.

Based on the movement of these features within a pair of images, the processor 150 may determine an FOE point 20. Over a number of pairs of images, the processor 150 may determine a sequence of FOE points 20, which over time may be clustered together (indicating no angular acceleration), temporarily outside a limited area (indicating angular acceleration of the vehicle 10), or permanently outside the limited area (indicating angular acceleration of the PND 1000 relative to the vehicle 10).

Figure 17:
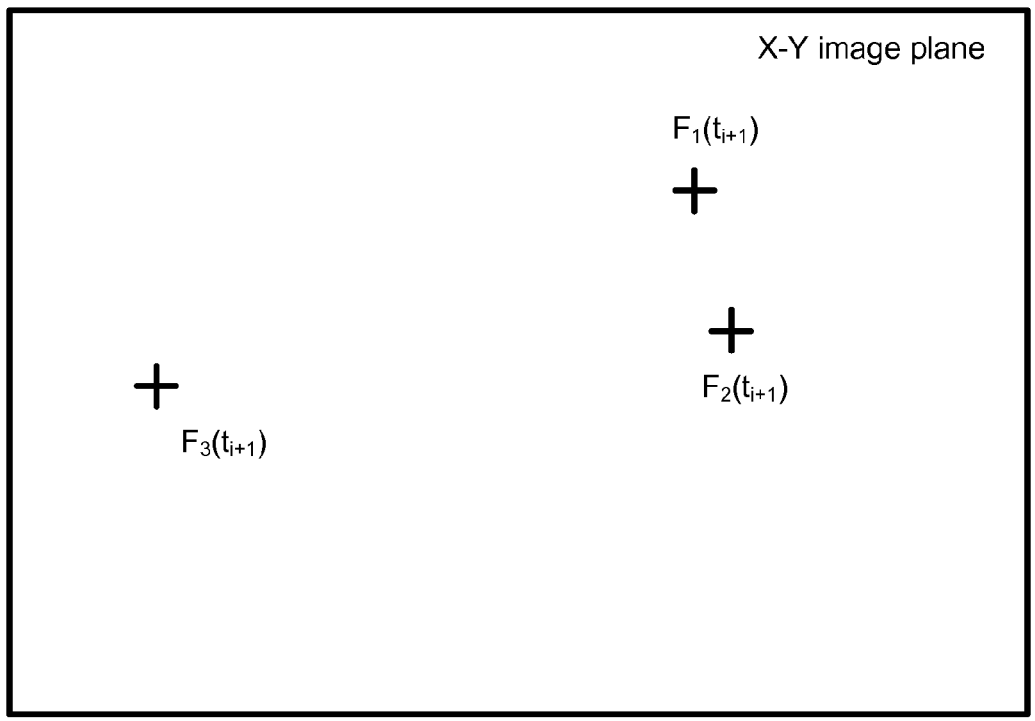

In the example of FIG. 17, the processor 150 receives a first image in a sequence of images and extracts one or more natural features from a first image thereby defining a corresponding first plurality of points (three features $F_1$, $F_2$ and $F_3$) within a first image taken at time $t_i$. In the X-Y image plane, the three features are shown as points $F_1(t_i)$, $F_2(t_i)$ and $F_3(t_i)$.

Figure 18:
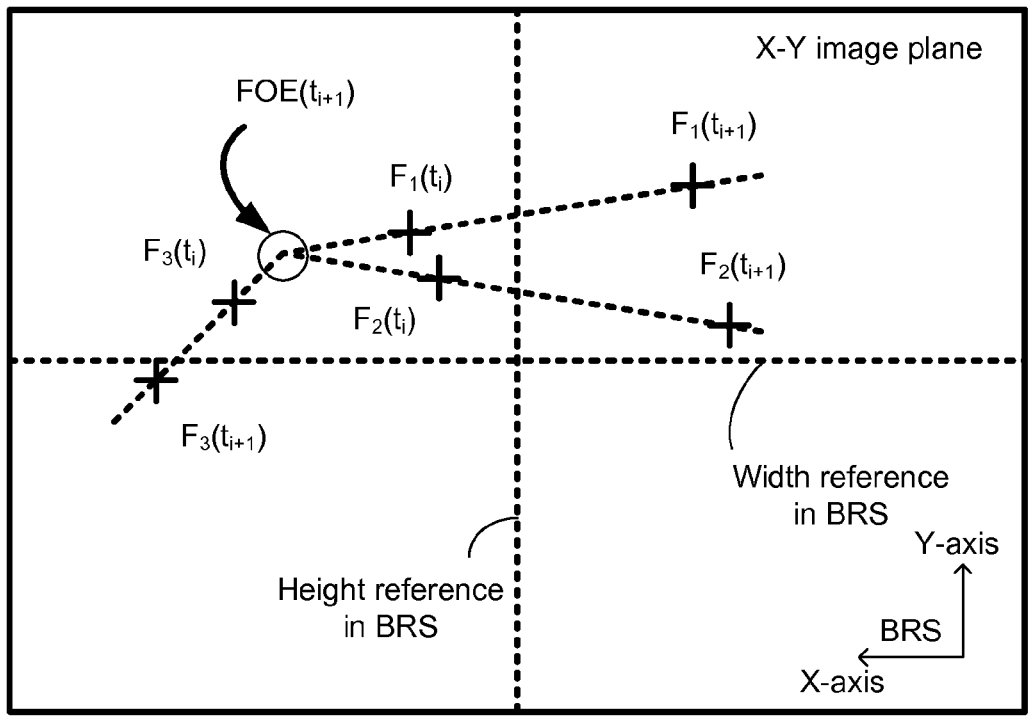

In FIG. 18, the processor 150 identifies the same three features within a second image taken at time $t_{i+1}$, shown as points $F_1(t_{i+1})$, $F_2(t_{i+1})$ and $F_3(t_{i+1})$. These features may be tracked by a correlation process between the second image and a patch of pixels about the feature in the first image.

Figure 19:
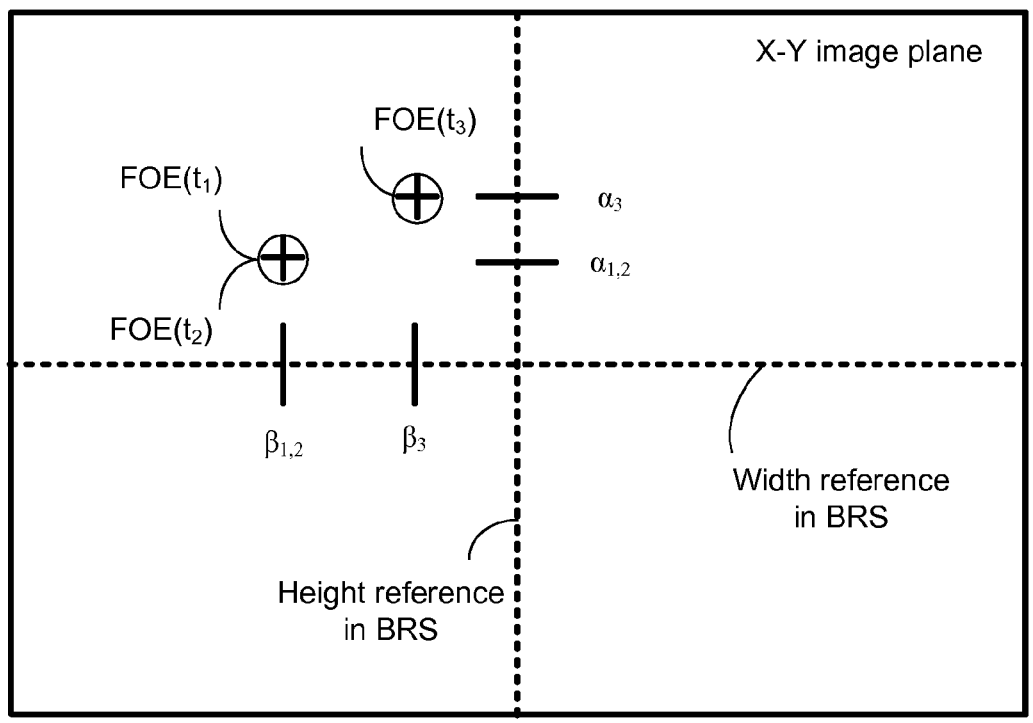

In FIG. 19, the processor 150 may place a line between the first and second positions of each feature $F_1$, $F_2$ and $F_3$ to identify an intersection of the lines. The intersection represents the FOE point 20 (or FOC point) at time $t_{i+1}$ shown as $FOE(t_{i+1})$. This intersection may be within the frame or outside the frame of the images. In some embodiments, the determined FOE points 20 are represented in the body reference system. In other embodiments, the determined FOE points 20 are represented in the local reference system or platform reference system.

The processor 150 may set the FOE point 20 at a center of the plurality of lines formed by the first and second positions of each feature $F_1$, $F_2$ and $F_3$. For example, the processor 150 may set the FOE point 20 to a point where two lines intersect or near where a cluster of lines intersect (e.g., a least-mean squared point).

If the FOE point 20 is centered in the image, then the camera 100 is pointing directly in the line of travel and the body of the PND 1000 is aligned with the direction of motion 50. Often, the direction of motion 50 is not aligned with the body of the PND 1000. If the FOE point 20 is above (or below) a center horizontal reference line (shown as a width reference), the PND 1000 is pointed down (or up) compared to the direction of motion 50. If the FOE point 20 is to the left (or right) of a center vertical reference line (shown as height reference), the PND 1000 is pointed to the right (or left) of the direction of motion 50.

If the lines connecting common features intersect at a point, then there is little or no roll between the two images. On the other hand, if only pairs of lines intersect and each of the intersections is spaced apart, then the PND 1000 is likely experiencing a roll clockwise or counter-clockwise roll. If the PND 1000 is experiencing a rolling action, then the PND 1000 is most likely being repositioned in the vehicle's mount, thus, the first rotation matrix ($C_{PRS \leftarrow BRS}$) and the third rotation matrix ($C_{LRS \leftarrow BRS}$) need to be recomputed.

To determine an amount of roll, the processor 150 may attempt to find an intersection of lines spiraling into an FOE point 20. Depending on the number of images processed and the number of degrees of motion, the processor 150 is able to determine a change in vertical angle (with respect to the height reference), horizontal angle (with respect to the width reference), and roll angle ($\Delta\alpha$, $\Delta\beta$, $\Delta\theta$) from the feature locations and FOE points 20.

FIG. 19 shows three FOE points 20 $FOE(t_1)=(\alpha_1, \beta_1)$, $FOE(t_2)=(\alpha_2, \beta_2)$ and $FOE(t_3)=(\alpha_3, \beta_3)$ from three corresponding pairs of images, where $\alpha_i$ represent height angle and $\beta_i$ represents width angle at time $t_i$. A first pair of images resulted in $FOE(t_1)$, a second pair of images resulted in $FOE(t_2)$ and a third pair of images resulted in $FOE(t_3)$. In this example, the first two FOE points 20 are co-located or clustered together such that $\alpha_1 \approx \alpha_2$ and $\beta_1 \approx \beta_2$ and the third FOE point 20 is apart from the first two such that $\alpha_3 \neq \alpha_1$ and/or $\beta_3 \neq \beta_1$. Therefore, between the first two pairs of images, the PND 1000 experienced little or no angular acceleration. From the second pair to the third pair of images though, the PND 1000 did experience some angular acceleration represented by the FOE transition from $(\alpha_2, \beta_2)$ to $(\alpha_3, \beta_3)$. If the FOE point 20 does not return to its first position and instead stays static at its new position, the PND 1000 has been rotated relative to the vehicle's mount (thus, the first rotation matrix ($C_{PRS \leftarrow BRS}$) and the third rotation matrix ($C_{LRS \leftarrow BRS}$) must be changed). If the FOE point 20 returns to its first position, then the vehicle 10 has undergone a turn (thus, the first rotation matrix ($C_{PRS \leftarrow BRS}$) is unchanged).

Figure 20:
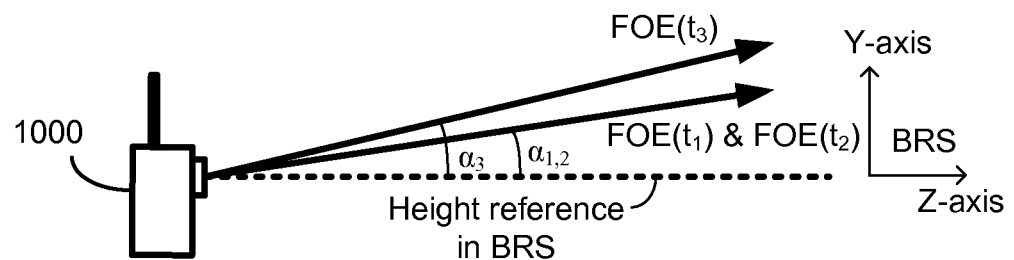

In FIG. 20, an example side view shows the PND 1000 and camera 100 having a height reference line ($\alpha_{REF}=0$). The first two direction vectors (formed based on the first two FOE points 20 $FOE(t_1)$ and $FOE(t_2)$) are coincident, which represents zero angular acceleration between the pairs of images. The third direction vector (formed based on the third FOE point 20 $FOE(t_3)$) is displaced from the first two direction vectors, which indicates that the PND 1000 underwent an angular acceleration. The processor 150 determines no change of height angle between times $t_1$ and $t_2$, however, it determents a change in height angle between times $t_2$ and $t_3$, which is $\Delta\alpha=\alpha_3-\alpha_2$.

Figure 21:
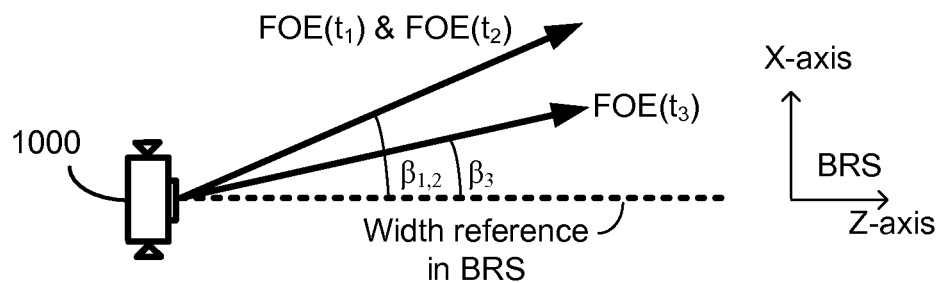

In FIG. 21, an example top view shows the PND 1000 and camera 100 having a width reference line ($\beta_{REF}=0$). The first two direction vectors are coincident and the third direction vector is displaced from the first two direction vectors, which indicates that the PND 1000 underwent an angular acceleration at time $t_3$. The processor 150 determines no change of width angle between time $t_1$ and $t_2$, however, it determents a change in width angle between times $t_2$ and $t_3$, which is $\Delta\beta=\beta_3-\beta_2$.

Figure 22:
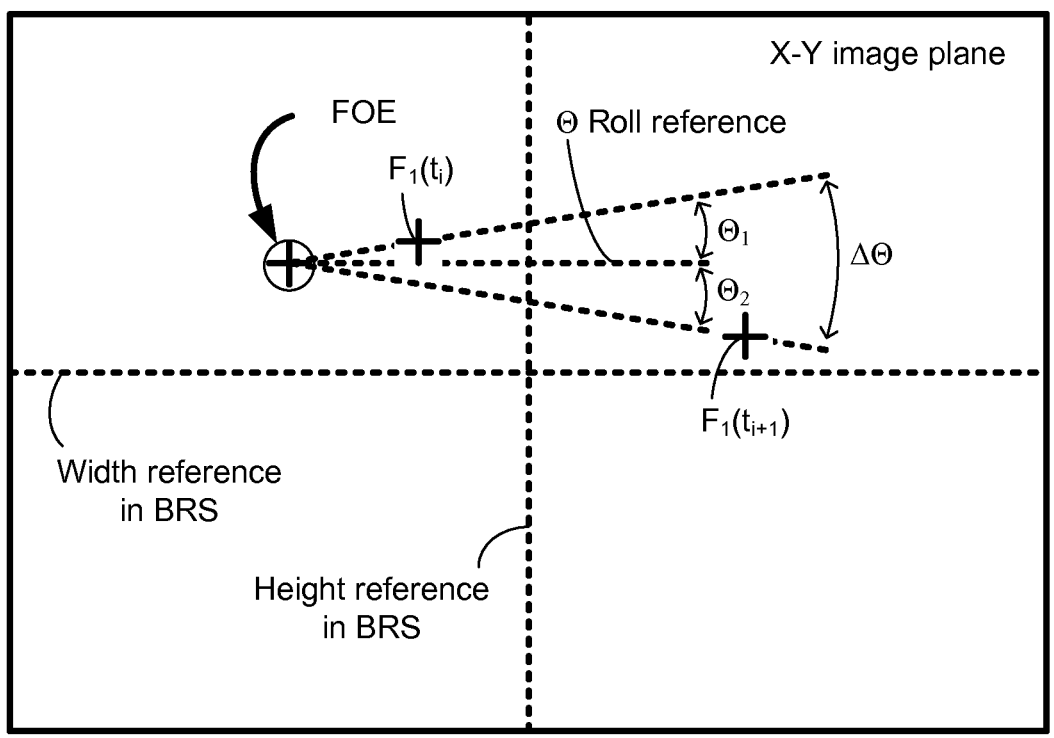

In FIG. 22, a feature is shown at a first location in the X-Y image plane from a first image and at a second location from a second image. Because of the roll experienced by the PND 1000, the feature points $F_1(t_i)$ and $F_1(t_{i+1})$ do not form a line with the determined FOE point 20. The roll of the first and second features from the respective first and second images is at $\theta=\theta_1$ and $\theta=\theta_2$ relative to a reference $\theta_{REF}=0$. The corresponding roll experienced by the PND 1000 between the first and second images is $\Delta\theta=\theta_2-\theta_1$. If a PND 1000 undergoes a roll, then the first rotation matrix ($C_{PRS \leftarrow BRS}$) and the third rotation matrix ($C_{LRS \leftarrow BRS}$) may be updated accordingly.

Figure 23:
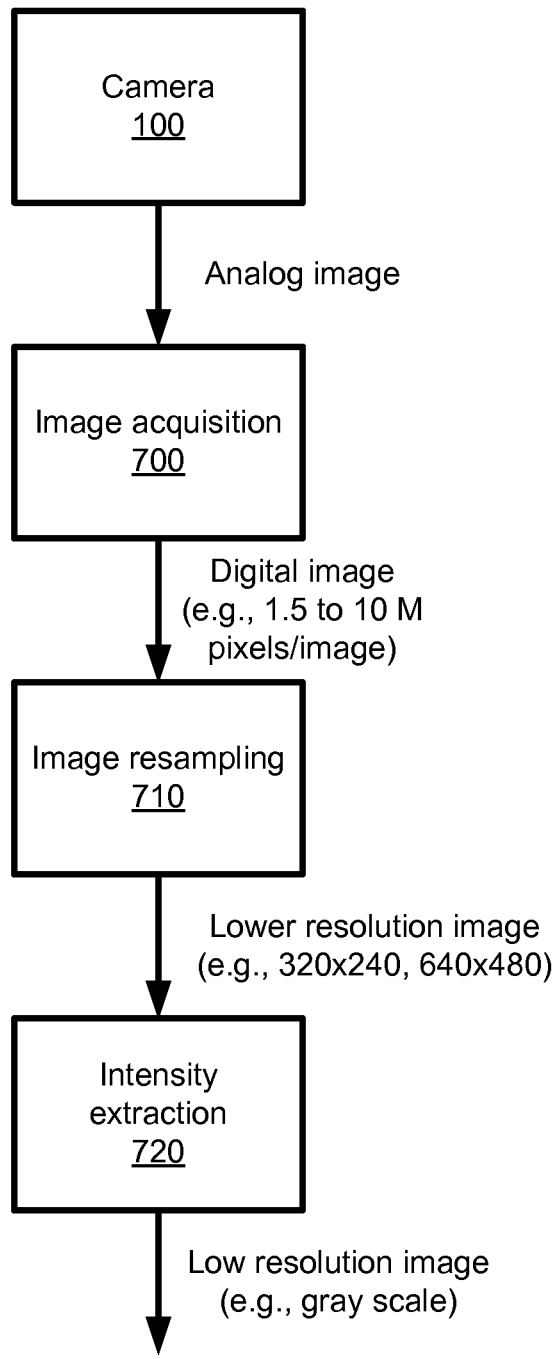
FIGS. 23, 24 and 25 show a data flow diagram for image processing, in accordance with embodiments of the present invention.
Figure 24:
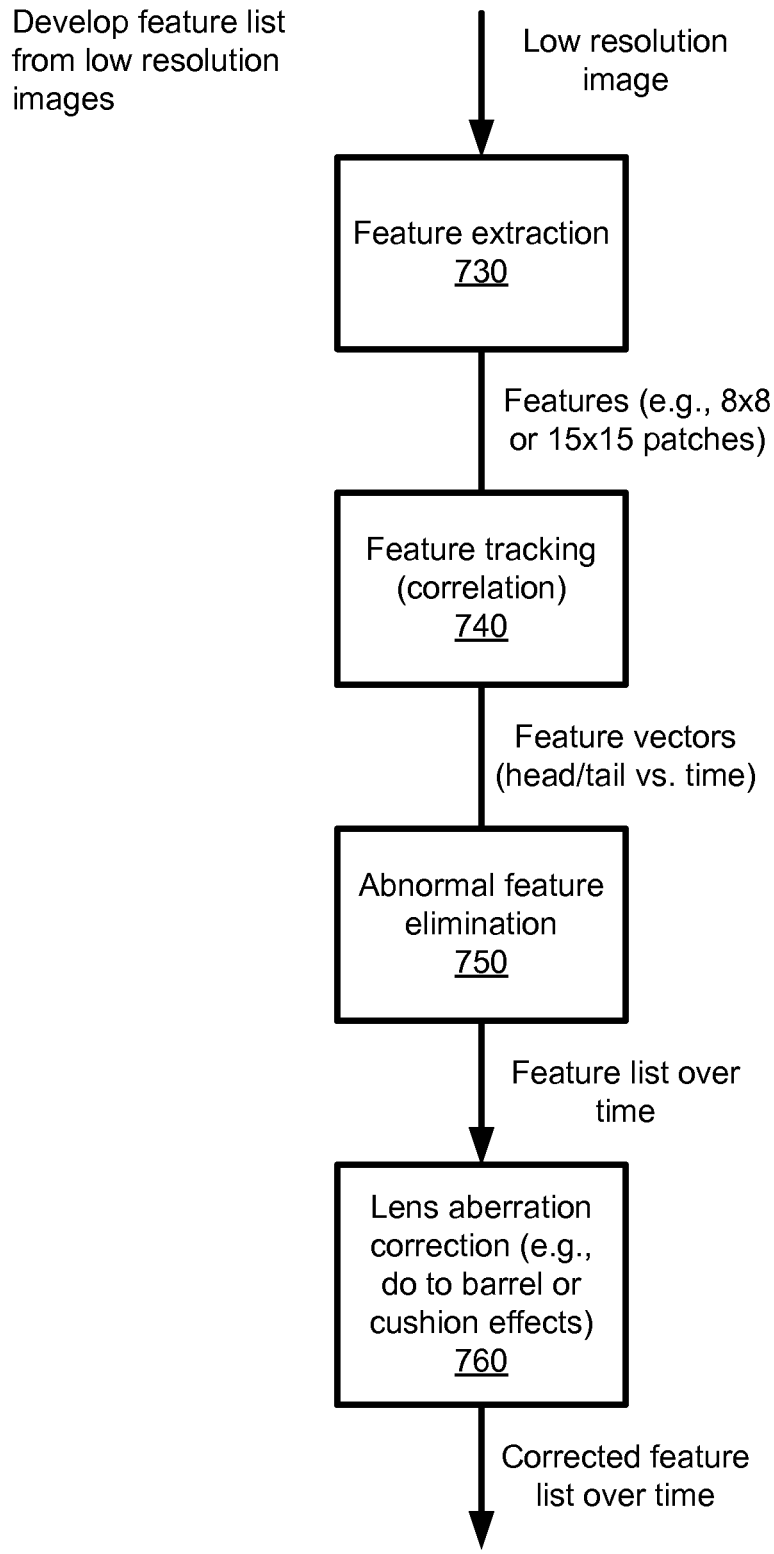
Figure 25:
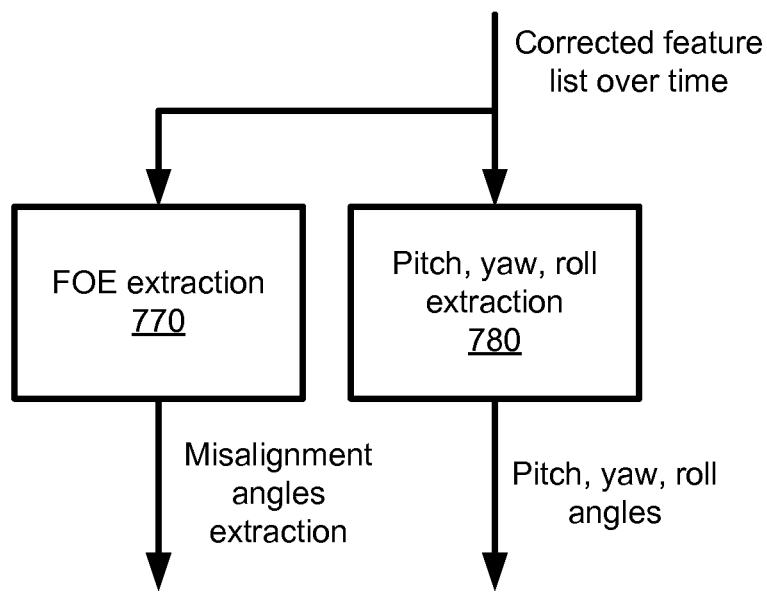

FIGS. 23, 24 and 25 show a data flow diagram for image processing, in accordance with embodiments of the present invention. In some embodiments, a full resolution image from a camera 100 is not necessary. By reducing the full-resolution image to a sub-resolution image, the processor 150 may use less computation and storage memory and more quickly process the sequence of images.

In FIG. 23 at 700, the processor 150 acts as a means to acquire a sequence of digital images from a camera 100. Alternately, an analog-to-digital converter between the camera 100 and the processor 150 acts as a means to acquire a sequence of images by converting an analog image from the camera 100 to a digital image (e.g., from 1.5 to 10 M pixels/ image). Alternatively, the camera 100 acts as a means for acquiring a sequence of images and directly supplies a digital image to the processor 150.

At 710, the processor 150 resamples the digital image to reduce the resolution of the digital image to a lower resolution image (e.g., 320×240 or 640×480). At 720, the processor 150 extracts intensity information or intensity values, thereby further reducing the resolution of the image to a low resolution image (e.g., gray scale). The act of resampling or the acts of resampling and intensity extraction may be performed by the processor 150, by the camera 100, by hardware between the two, or by a combination of the camera 100, extra hardware and/or the processor 150. If the resolution is low enough, one or both of the steps may be skipped.

Continuing in FIG. 24 at 730, the processor 150 extracts one or more natural features, where $F_j(t_i)M$ represents the location of the $j^{th}$ features at time $t_i$ in image i to generate or update a feature list. Each feature may be defined by a patch of pixels (e.g., 8×8 or 15×15 pixels) within the image.

At 740, the processor 150 performs feature tracking. All features or a set of features are searched for in the next image of the pair. For example, the processor 150 may perform correlation between the pixel patch and the next image to locate the position of the feature on the next image.

At 750, the processor 150 may eliminate abnormal features from the feature list. An abnormal feature may be a feature found in an image that does not have a corresponding feature in next image (or vice versa). The feature list will evolve over time to drop old features no longer found in the images but also add new features as they are detected in new images.

At 760, the processor 150 adjusted the locations of features to account for a lens aberration or aberrations. In this manner, the processor 150 corrects the sequence of image to remove the lens aberrations. In some instances, a high quality lens induces little or no distortion to an image. Low quality lenses may have imperfections that distort the captured image such that points in a line do not appear in a line on the image. A common form of lens distortion comes from non-uniform magnification by the lens (e.g., barrel distortion and pin-cushion distortion), which magnifies the perimeter of the image differently than the center of the image. With barrel distortion, the magnification diminished towards the edges of the image. With pin-cushion distortion, the magnification pinches or narrows the image at the sides. The processor 150 removes this distortion such that relative locations of features are more properly represented, thereby providing a corrected feature list over time. The processor 150 may perform this correction on a selected number of points (e.g., the detected and tracked features) rather than on the raw image or lower or low resolution image, thereby reducing processing necessary for the computation.

Figure 16:
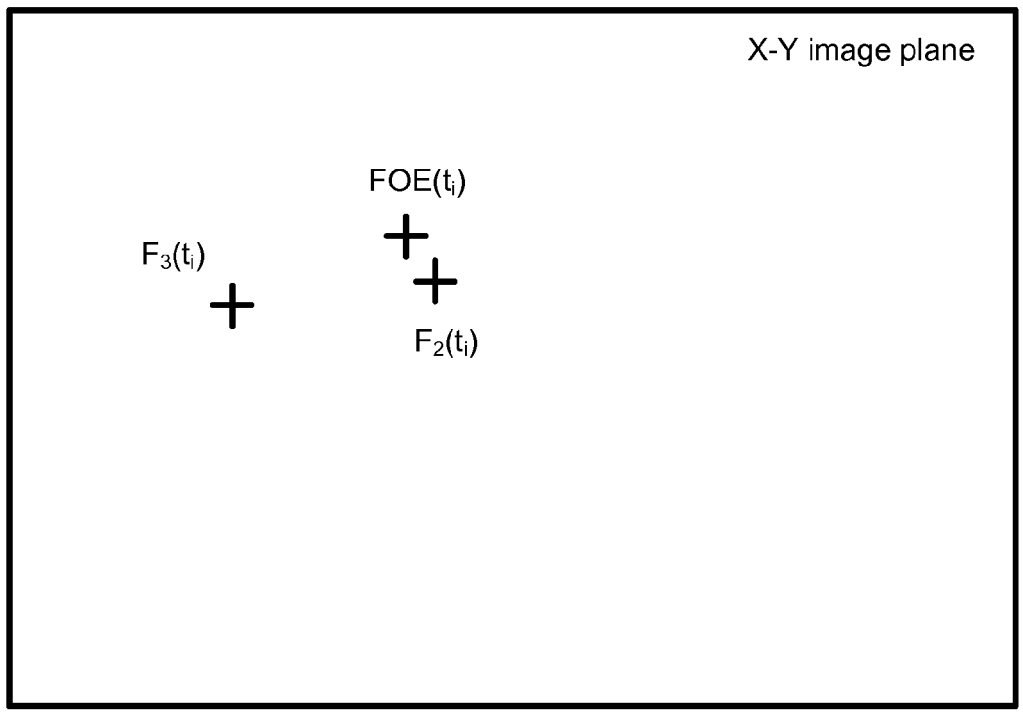
FIGS. 16, 17, 18, 19, 20, 21 and 22 show features relative to one another, in accordance with embodiments of the present invention.

The corrected feature points are shown in FIGS. 16 and 17. A pair of tracked features (one from the first image and a tracked feature from second image) defines a line in the X-Y image plane. Ideally, multiple of such lines from multiple tracked features define a common intersection for all of the lines. Practically, the lines intersect in a region or area. The FOE point 20 may be defined as a center point of this region, for example, by determining a least-squares error point of the plurality of lines or based on a based on Kalman filter estimate. In some embodiments, feature pairs resulting in a line defining intersecting points not corresponding to the other intersecting points are discarded as being caused by abnormal features. The processor 150 may eliminate such abnormal features from consideration and from effecting the FOE computation.

In FIG. 25 at 770, the processor 150 uses the corrected feature list to extract a sequence of FOE points 20 out of a corresponding sequence of pairs of images. The process of extracting an FOE point is described above with reference to FIGS. 16, 17, 18 and 19. At 780, the processor 150 also uses the corrected feature list to extract height, width and roll angle, which is described above with reference to FIGS. 20-22.

As described above, a sequence of images may be used to accurately determine a gravitational vector, a first rotation matrix ($C_{PRS \leftarrow BRS}$), a second rotation matrix ($C_{LRS \leftarrow PRS}$) and a third rotation matrix ($C_{LRS \leftarrow BRS}$). The sequence of images may also be used to update these rotation matrices and to update gyrometer calibrations values. The sequence of images is also used to determine whether a PND 1000 has been moved in its mount. With these matrices and values, accelerometer measurements and gyrometer measurements include less inherent error. As a result, accumulated measurements include less accumulated error and a resulting dead-reckoning position is more accurate for a longer period of time. Therefore, a sequence of images may be used to improve dead-reckoning navigation. In this manner, a processor 150 within a PND 1000 performs more accurate dead reckoning based on the sequence of images.

The methodologies described herein may be implemented by various means depending upon the application. For example, these methodologies may be implemented in hardware, firmware, software, or any combination thereof. For a hardware implementation, the processing units may be implemented within one or more of: an application specific integrated circuit (ASIC), a digital signal processor (DSP), a digital signal processing device (DSPD), a programmable logic device (PLD), a field programmable gate array (FPGA), a processor, a controller, a micro-controller, a microprocessor, an electronic device, a digital processing apparatus or other electronic unit designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by the processor 150 or other processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A mobile device using images for navigation, the mobile device comprising:
   a camera, wherein the camera acquires a sequence of images;
   a memory to hold three rotation matrices comprising:
      a first rotation matrix, wherein the first rotation matrix is for converting between a body reference system of the mobile device and a platform reference system of a vehicle;
      a second rotation matrix, wherein the second rotation matrix is for converting between the platform reference system of the vehicle and a local reference system; and
      a third rotation matrix, wherein the third rotation matrix is for converting between the body reference system and the local reference system; and
   a processor coupled to the camera and the memory, wherein the processor is configured to:
      set an initial value of the first rotation matrix based on the sequence of images; and
      set an initial value of the third rotation matrix based on the sequence of images.

2. The mobile device of claim 1, further comprising:
   an accelerometer to provide accelerometer measurements;
   wherein the processor is further coupled to the accelerometer; and
   wherein the processor is further configured to set an initial value of a gravitational vector based on the sequence of images, wherein the gravitational vector is used to null an effect of gravity in the accelerometer measurements.

3. The mobile device of claim 2, the accelerometer comprises a three-dimensional accelerometer.

4. The mobile device of claim 1, further comprising:
   a gyrometer functionally coupled to the camera;
   wherein the processor is further coupled to the gyrometer.

5. The mobile device of claim 4, wherein the processor is further configured to update calibration of the gyrometer based on the sequence of images.

6. The mobile device of claim 1, further comprising a position location module.

7. The mobile device of claim 6, wherein the position location module comprises a global navigation satellite system receiver (GNSS receiver).

8. The mobile device of claim 7, wherein the GNSS receiver comprises a global positioning satellite (GPS) receiver.

9. The mobile device of claim 1, wherein the mobile device is mechanically coupled to the vehicle.

10. The mobile device of claim 1, wherein the processor is further configured to perform dead reckoning based on the sequence of images.

11. The mobile device of claim 1, further comprising:
    an accelerometer to provide accelerometer measurements; and
    a gyrometer functionally coupled to the camera;
    wherein the processor is further coupled to the accelerometer and the gyrometer; and
    wherein the processor is further configured to:
       set an initial value of a gravitational vector based on the sequence of images, wherein the gravitational vector is used to null an effect of gravity in acceleration measurements; and
       update calibration of the gyrometer based on the sequence of images.

12. A method in a mobile device of using images for navigation, the method comprising:
    acquiring a sequence of images from a camera;
    setting an initial value of a first rotation matrix based on the sequence of images, wherein the first rotation matrix is for converting between a body reference system of the mobile device and a platform reference system of a vehicle;
    setting an initial value of a second rotation matrix based on the sequence of images, wherein the second rotation matrix is for converting between the platform reference system of the vehicle and a local reference system;
    setting an initial value of a third rotation matrix based on the sequence of images, wherein the third rotation matrix is for converting between the body reference system and the local reference system;
    writing the second rotation matrix to memory; and
    converting measurements, between a body reference system and a local reference system, using the third rotation matrix.

13. The method of claim 12, further comprising
    setting an initial value of a gravitational vector based on the sequence of images;
    wherein the gravitational vector is used to null an effect of gravity in accelerometer measurements.

14. The method of claim 12, further comprising updating a calibration of a gyrometer based on the sequence of images.

15. The method of claim 12, further comprising mechanically coupling the mobile device to a vehicle.

16. The method of claim 12, wherein acquiring the sequence of images comprises resampling the sequence of images, having a first resolution, to a second resolution, wherein the second resolution is lower than the first resolution.

17. The method of claim 12, wherein acquiring the sequence of images comprises extracting intensity values from the sequence of images.

18. The method of claim 12, wherein setting the initial value of the second rotation matrix based on the sequence of images comprises determining a Focus of Expansion point (FOE point) derived from at least two of the sequence of images to set a direction of movement of the mobile device in a body reference system, and further comprising:

determining a gravitational vector in the body reference system; and computing the first rotation matrix based on:
(1) the third rotation matrix; and
(2) an inverse of the second rotation matrix.

19. The method of claim 18, wherein the FOE point indicates a height angle ($\alpha$) and a width angle ($\beta$) relative to the body reference system.

20. The method of claim 18, wherein the FOE point indicates a point in an X-Y image plane relative to the body reference system.

21. The method of claim 18, wherein determining the FOE point comprises:

extracting a plurality of features from a first image of the sequence of images thereby defining a corresponding first plurality of points;

tracking the plurality of features on a second image of the sequence of images thereby defining a corresponding second plurality of points and further defining a corresponding plurality of lines between the corresponding first plurality of points and the corresponding second plurality of points; and setting the FOE point at a center of the corresponding plurality of lines.

22. The method of claim 21, wherein the center of the corresponding plurality of lines comprises a least-squares error point of the corresponding plurality of lines.

23. The method of claim 21, wherein the center of the corresponding plurality of lines is based on Kalman filter estimate.

24. The method of claim 12, wherein acquiring the sequence of images comprises correcting the sequence of images to remove a lens aberration.

25. A mobile device using images for navigation, the mobile device comprising:

means for acquiring a sequence of images from a camera;

means for setting an initial value of a first rotation matrix based on the sequence of images used to convert from a body reference system of the mobile device and a platform reference system of a vehicle;

means for setting an initial value of a second rotation matrix based on the sequence of images, wherein the second rotation matrix is for converting between the platform reference system of the vehicle and a local reference system;

means for setting an initial value of a third rotation matrix based on the sequence of images, wherein the third rotation matrix is for converting between the body reference system and the local reference system;

means for writing the third rotation matrix to memory; and means for converting measurements, between the body reference system of the mobile device and a local reference system, using the third rotation matrix.

26. A non-transitory computer-readable medium tangibly embodying a program of machine-readable instructions executable by a digital processing apparatus to perform a method for using images for navigation in a mobile device having a camera, memory and a processor, said method comprising operations of:

acquiring a sequence of images from a camera;

setting an initial value of a first rotation matrix based on the sequence of images, wherein the first rotation matrix is for converting between a body reference system of the mobile device and a platform reference system of a vehicle;

setting an initial value of a second rotation matrix based on the sequence of images, wherein the second rotation matrix is for converting between the platform reference system of the vehicle and a local reference system;

setting an initial value of a third rotation matrix based on the sequence of images, wherein the third rotation matrix is for converting between the body reference system and the local reference system;

writing the third rotation matrix to memory; and converting measurements, between the body reference system of the mobile device and a local reference system, using the third rotation matrix.

* * * * *